US012534188B2

(12) United States Patent
Depenbusch et al.

(10) Patent No.: US 12,534,188 B2
(45) Date of Patent: Jan. 27, 2026

(54) SYSTEMS AND METHODS FOR FLIGHT CONTROL OF AIRCRAFT

(71) Applicant: Archer Aviation Inc., San Jose, CA (US)

(72) Inventors: Nathan Thomas Depenbusch, Mountain View, CA (US); Marcus Aaron Dunavan, Overland Park, KS (US); Andrew Ging Wei Holup, Sunnyvale, CA (US); Jong-Yeob Shin, Hoschton, GA (US); Alexander Oliver Haas, Reno, NV (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 19/072,231

(22) Filed: Mar. 6, 2025

(65) Prior Publication Data
US 2026/0015079 A1    Jan. 15, 2026

Related U.S. Application Data

(63) Continuation of application No. PCT/US2024/037419, filed on Jul. 10, 2024.
(Continued)

(51) Int. Cl.
*B64C 13/16* (2006.01)
*B64D 45/00* (2006.01)
*G08B 21/18* (2006.01)

(52) U.S. Cl.
CPC .......... *B64C 13/16* (2013.01); *B64D 45/0005* (2013.01); *G08B 21/182* (2013.01)

(58) Field of Classification Search
CPC .... B64C 13/16; B64D 45/0005; G08B 21/182
See application file for complete search history.

(56) References Cited

U.S. PATENT DOCUMENTS

| | | | |
|---|---|---|---|
| 5,001,646 | A | 3/1991 | Caldwell et al. |
| 8,256,718 | B2 | 9/2012 | Fleddermann et al. |

(Continued)

FOREIGN PATENT DOCUMENTS

| | | |
|---|---|---|
| CN | 117390899 A | 1/2024 |
| EP | 3891067 B1 | 1/2024 |
| WO | 2020180373 A2 | 9/2020 |

OTHER PUBLICATIONS

International Search Report in International PCT Application No. PCT/US2024/037419, mailed Aug. 19, 2024, 2 pages.
(Continued)

*Primary Examiner* — Donald J Wallace
*Assistant Examiner* — Jalal C Coduroglu
(74) *Attorney, Agent, or Firm* — Finnegan, Henderson, Farabow, Garrett & Dunner, LLP

(57) ABSTRACT

Aspects of the present disclosure generally relate to systems and methods for flight control of aircrafts driven by electric propulsion systems and in other types of vehicles. In one embodiment, a computer-implemented method is disclosed, comprising: measuring one or more state variables of the aircraft; inputting the one or more measured state variables to a prioritization scheme configured to determine an optimized actuator setting; determining one or more actuator commands based at least in part on inputting the one or more measured state variables to the prioritization scheme; and automatically controlling at least one actuator of the aircraft based on the determined one or more actuator commands.

30 Claims, 11 Drawing Sheets

Related U.S. Application Data

(60) Provisional application No. 63/512,784, filed on Jul. 10, 2023.

(56) References Cited

U.S. PATENT DOCUMENTS

| | | |
|---|---|---|
| 8,676,544 B2 | 3/2014 | Calmels |
| 8,706,460 B2 | 4/2014 | Falangas |
| 9,254,909 B2 | 2/2016 | Moser et al. |
| 9,446,837 B2 | 9/2016 | Wildschek et al. |
| 9,764,825 B2 | 9/2017 | Guida |
| 9,898,033 B1 | 2/2018 | Long |
| 10,562,610 B2 | 2/2020 | Guida |
| 10,967,951 B2 | 4/2021 | Mahmulyin |
| 10,983,534 B2 | 4/2021 | English et al. |
| 11,685,516 B2 | 6/2023 | Ivanco et al. |
| 11,834,152 B2 | 12/2023 | Ho et al. |
| 2002/0153452 A1 | 10/2002 | King et al. |
| 2004/0093130 A1* | 5/2004 | Osder ............ G05D 1/0858 244/175 |
| 2007/0129815 A1* | 6/2007 | Flemisch .......... G05B 7/02 700/11 |
| 2009/0287365 A1* | 11/2009 | Riedinger ........ G05D 1/0808 701/5 |
| 2010/0076625 A1 | 3/2010 | Yoeli |
| 2012/0318929 A1* | 12/2012 | Golling ............ B64D 39/00 244/203 |
| 2013/0138270 A1 | 5/2013 | Christensen et al. |
| 2015/0083850 A1 | 3/2015 | Moser et al. |
| 2015/0203215 A1 | 7/2015 | Falangas |
| 2018/0362149 A1* | 12/2018 | Huynh ............. B64C 13/42 |
| 2019/0332125 A1 | 10/2019 | Irwin, III et al. |
| 2021/0047995 A1* | 2/2021 | Maris ............. G01M 9/065 |
| 2021/0362847 A1* | 11/2021 | Mahboubi ........ G05D 1/0858 |

OTHER PUBLICATIONS

Nguyen et al. "Development of Variable Camber Continuous Trailing Edge Flap for Performance Adaptive Aeroelastic Wing." SAE Technical Paper Series, Sep. 15, 2015, https://doi. org/10.4271/2015-01-2565. 33 pages.

Kim et al. "Development of Flight Control Laws for the T-50 Advanced Supersonic Jet Trainer." International Journal of Aeronautical and Space Sciences, vol. 8, No. 1, Jun. 30, 2007, pp. 32-45, https://doi.org/10.5139/ijass.2007.8.1.032. 14 pages.

Qiu et al. "Improving Aileron Effectiveness based on Changing the Position of Aileron Connectors." International Journal of Aerospace Engineering, vol. 2019, Jun. 4, 2019, pp. 1-13, https://doi.org/10.1155/2019/5046395. 14 pages.

Kaneko et al. "Operational Loads Regression Equation Development for Advanced Fighter Aircraft." 24th International Congress of the Aeronautical Sciences, 2004. 9 pages.

Walker et al. "F-35B Integrated Flight-Propulsion Control Development." 2013 International Powered Lift Conference, Aug. 8, 2013. https://doi.org/10.2514/6.2013-4243. 15 pages.

Viganó et al. "Development of augmented control laws for a tiltrotor in low and high speed flight modes." 2017. http://hdl.handle.net/20.500.11881/3877. 14 pages.

Denham, Jr. et al. "Converging on a Precision Hover Control Strategy for the F-35B Stovl Aircraft." AIAA Guidance, Navigation, and Control Conference and Exhibit 2008, Aug. 2008. https://doi.org/10.2514/6.2008-6331. 13 pages.

Whittle. "Flying the Osprey Is Not Dangerous, Just Different: Veteran Pilots." Breaking Defense, Breaking Defense, Sep. 5, 2012, breakingdefense.com/2012/09/flying-the-osprey-is-not-dangerous-just-different-veteran-pilo/. 11 pages.

Kang et al. "Development of Flight Control System and Troubleshooting on Flight Test of a Tilt-Rotor Unmanned Aerial Vehicle." International Journal of Aeronautical and Space Sciences, vol. 17, No. 1, Mar. 30, 2016, pp. 120-131, https://doi.org/10.5139/ijass.2016.17.1.120. 12 pages.

* cited by examiner

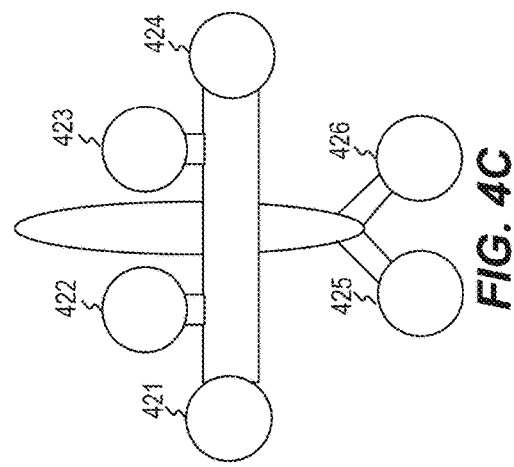
FIG. 4C
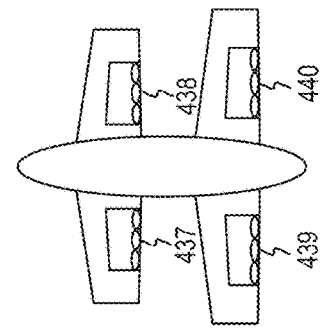
FIG. 4F
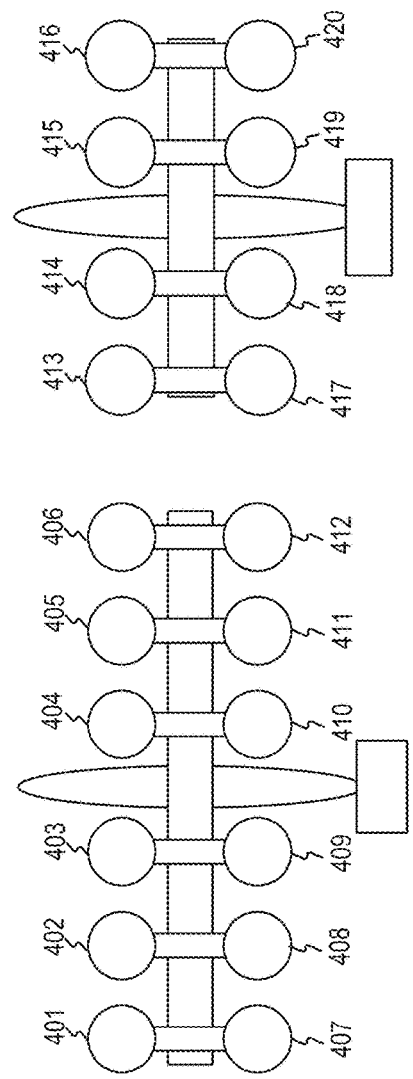
FIG. 4B
FIG. 4A
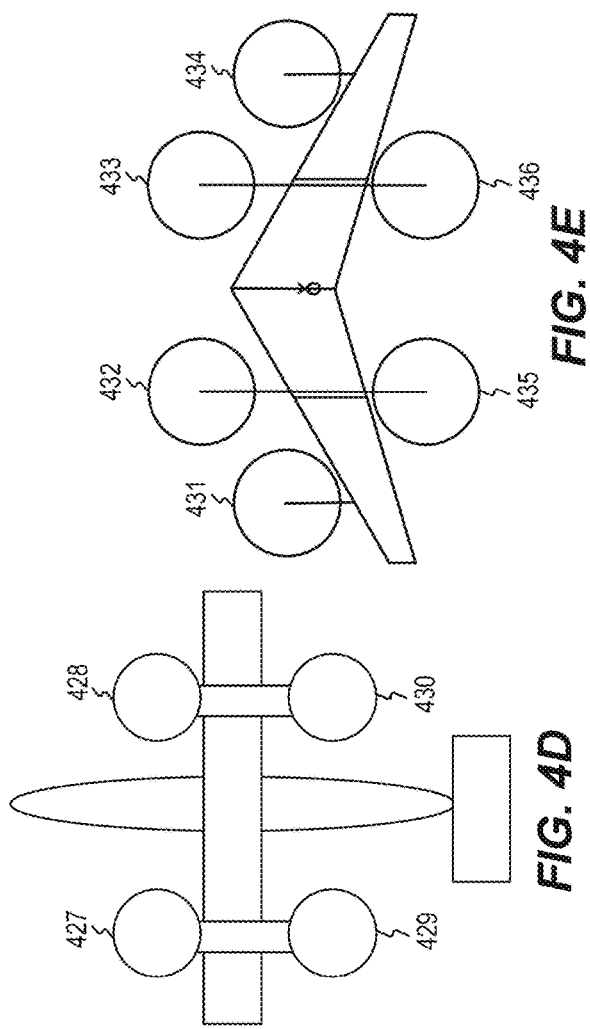
FIG. 4E
FIG. 4D

SYSTEMS AND METHODS FOR FLIGHT CONTROL OF AIRCRAFT

CROSS-REFERENCE TO RELATED APPLICATIONS

This application is a continuation of, and claims priority to and benefit of PCT Application No. PCT/US2024/037419, titled "SYSTEMS AND METHODS FOR FLIGHT CONTROL OF AIRCRAFT," filed on Jul. 10, 2024, which claims priority to U.S. Provisional Application No. 63/512,784, titled "SYSTEMS AND METHODS FOR FLIGHT CONTROL OF EVTOL AIRCRAFT," filed on Jul. 10, 2023, the contents of all of which are incorporated herein in their entireties for all purposes.

TECHNICAL FIELD

This disclosure relates generally to powered aerial vehicles. More particularly, and without limitation, the present disclosure relates to innovations in aircrafts driven by electric propulsion systems. Certain aspects of the present disclosure generally relate to systems and methods for flight control of aircrafts driven by electric propulsion systems and in other types of vehicles, as well as flight control of aircrafts in flight simulators and video games. Other aspects of the present disclosure generally relate to improvements in flight control systems and methods that provide particular advantages in aerial vehicles and may be used in other types of vehicles.

BACKGROUND

The inventors here have recognized several problems that may be associated with flight control of aircraft, including a tilt-rotor aircraft that uses electrical or hybrid-electric propulsion systems (hereinafter referred to as electric propulsion units or "EPUs"). Throughout its operational lifespan, an aircraft may face various load-related challenges, such as aerodynamic loads, weight loads, inertial loads, structural loads, and environmental loads, among others. Over time and depending on certain maneuvers, loads may not only affect fuel efficiency and passenger comfort, but may also affect structural integrity and compromise safety, such as by leading to accidents due to component or aircraft structural failure.

While conventional aircrafts may utilize hydraulic actuators for control surfaces, which may be capable of holding a control surface position against a load with no power input, some aircrafts may be more architecturally complex than conventional aircrafts, requiring more sophisticated methods to prevent excessive wear caused by holding control surfaces against a load. For example, aircrafts powered, in part or in whole, by electric systems may utilize electric actuators for control surfaces, which may require energy to hold a control surface position against a load and increase the likelihood of the electric actuator overheating and/or becoming damaged.

Therefore, there is a need for improved systems and methods for controlling certain aircrafts to preserve actuator health and lifespan.

SUMMARY

The present disclosure relates generally to flight control of electric aircraft and other powered aerial vehicles. More particularly, and without limitation, the present disclosure relates to innovations in tilt-rotor aircraft that use electrical propulsion systems. For example, certain aspects of the present disclosure relate to providing control surface regulation to continuously control one or more electric actuators according to control signals, environmental variables, or other factors relating to the aircraft state.

Disclosed embodiments may include a control surface regulation function configured to dynamically determine and implement a control surface position. For example, the control surface regulation function may be configured to determine an optimized control surface position based on minimizing torque of an electric actuator for a control surface while maximizing aerodynamic performance.

One aspect of the present disclosure comprises a computer-implemented method for controlling an aircraft, comprising: measuring one or more state variables of the aircraft; inputting the one or more measured state variables to a prioritization scheme configured to determine an optimized actuator setting; determining one or more actuator commands based at least in part on inputting the one or more measured state variables to the prioritization scheme; and automatically controlling at least one actuator of the aircraft based on the determined one or more actuator commands.

Another aspect of the present disclosure comprises a system for controlling an aircraft, comprising: at least one processor and at least one non-transitory computer-readable medium storing instructions that, when executed by the at least one processor, cause the at least one processor to perform operations comprising: measuring one or more state variables of the aircraft; inputting the one or more measured state variables to a prioritization scheme configured to determine an optimized actuator setting; determining one or more actuator commands based at least in part on inputting the one or more measured state variables to the prioritization scheme; and automatically controlling at least one actuator of the aircraft based on the determined one or more actuator commands.

Yet another aspect of the present disclosure comprises a non-transitory computer-readable medium storing instructions that, when executed by at least one processor, cause the at least one processor to perform operations comprising: measuring one or more state variables of the aircraft; inputting the one or more measured state variables to a prioritization scheme configured to determine an optimized actuator setting; determining one or more actuator commands based at least in part on inputting the one or more measured state variables to the prioritization scheme; and automatically controlling at least one actuator of the aircraft based on the determined one or more actuator commands.

Yet another aspect of the present disclosure comprises a flight control system, including at least one processor configured to perform operations comprising: measuring one or more state variables of the aircraft; inputting the one or more measured state variables to a prioritization scheme configured to determine an optimized actuator setting; determining one or more actuator commands based at least in part on inputting the one or more measured state variables to the prioritization scheme; and automatically controlling at least one actuator of the aircraft based on the determined one or more actuator commands.

BRIEF DESCRIPTION OF THE DRAWINGS

FIGS. 4A-4F illustrate exemplary top plan views of VTOL aircraft, consistent with disclosed embodiments.

DETAILED DESCRIPTION

Figure 1:
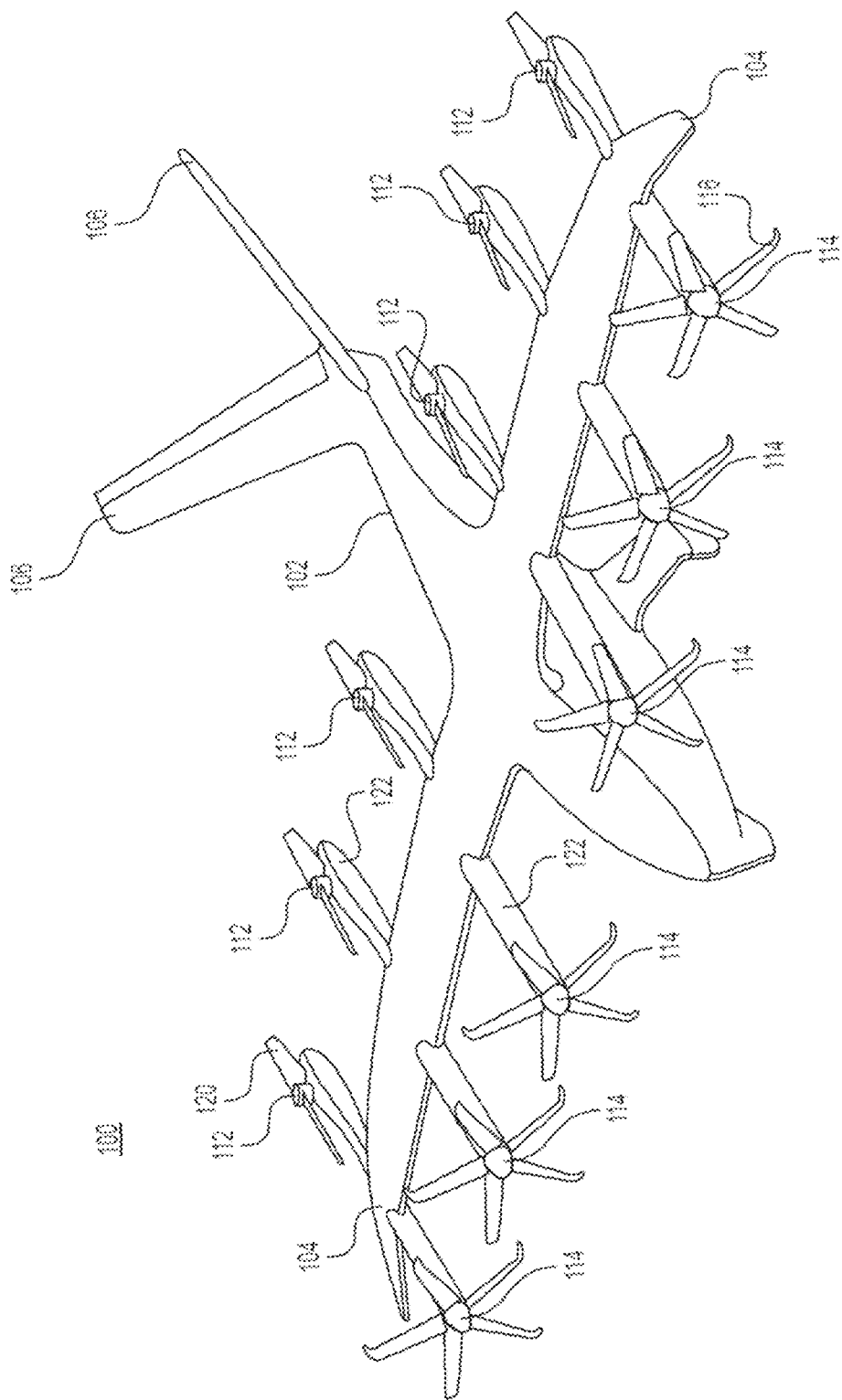
FIG. 1 shows an exemplary VTOL aircraft, consistent with disclosed embodiments.

The present disclosure addresses systems, components, and techniques primarily for use in an aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller) configured to allow the aircraft to fly. The aircraft may include any configuration that includes at least one propeller. In some embodiments, the aircraft is driven (e.g., provided with thrust) by one or more electric propulsion systems (hereinafter referred to as electric propulsion units or "EPUs"), which may include at least one engine, at least one rotor, at least one propeller, or any combination thereof. The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it is desirable to control the aircraft components in a manner that decreases loads to improve aircraft performance (e.g., extend lifetime of parts, decrease risk of failure, decrease weight, improve pilot control).

Disclosed embodiments provide new and improved configurations of aircraft components, some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system. For example, implementing a control surface position regulation function, as described and exemplified below, may provide a method for aircraft control that may maintain current levels of reasonable pilot workload (e.g., with respect to conventional aircraft) while including smaller, lighter actuators, which may improve flight performance and efficiency.

In some embodiments, the aircraft driven by a propulsion system of the present disclosure may be designed to be capable of both vertical and conventional takeoff and landing, with a distributed propulsion system enabling vertical flight, horizontal and lateral flight, and transition (e.g., transitioning between vertical flight and horizontal flight). The aircraft may generate thrust by supplying high voltage electrical power to a plurality of engines of the distributed propulsion system, which may include components to convert the high voltage electrical power into mechanical shaft power to rotate a propeller.

Embodiments may include an electric engine (e.g., motor) connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft configured to use at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase) to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase). Horizontal thrust may be thrust in a primarily horizontal direction (e.g., during a cruise-phase).

In some embodiments, a "phase of flight," or "flight mode," (e.g., hover, cruise, forward flight, takeoff, landing, transition) may be defined by a combination flight conditions (e.g., a combination of flight conditions within particular ranges), which may include one or more of an airspeed, altitude, pitch angle (e.g., of the aircraft), tilt angle (e.g., of one or more propellers), roll angle, rotation speed (e.g., of a propeller), torque value, pilot command, or any other value indicating a current or requested (e.g., commanded) state of at least part of the aircraft.

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed herein, embodiments of the aircraft may include many movable structural flight elements that allow pilots to safely control the aircraft. Flight control surfaces (e.g., flaperons, flaps, ailerons, elevators, rudders, etc.) are critical to controlling the positioning of the aircraft. Changes to the orientation of these surfaces changes the airflow and pressure distribution around the aircraft, allowing the pilot to control the movement of the aircraft in three axes of rotation. Similarly, rotation and orientation control of propellers may provide lift support (e.g., lift required for vertical take-off, landing, and hovering) and may provide the forward thrust required to move the aircraft through the air. The movement of each of these flight elements is critical to the safety and stability of the aircraft.

As further detailed below with reference to FIG. 6, mitigating stresses (e.g., alleviating loads) on critical aircraft components may be paramount to ensure structural integrity, stability and safety of an aircraft. By actively managing aerodynamic forces, load alleviation may extend the operational lifespan of an aircraft and reduce risks of structural failures. While conventional aircrafts may be designed to handle predictable flight conditions and load distributions, more complex aircrafts, such as eVTOLs (electric vertical takeoff and landing aircraft), may require more complex algorithms for alleviating loads. For example, unlike traditional fixed-wing aircrafts, eVTOLs may employ distributed propulsion systems, unique configurations (e.g., structural architecture), and/or multiple flight modes. As a result, alleviating loads in eVTOLs may be improved through complex algorithms and control strategies to manage dynamic aerodynamic loads during different phases of flight (e.g., vertical takeoff, hover, transition to forward flight, forward flight, landing, etc.). Furthermore, some aircrafts may be designed to operate in urban environments with critical noise regulations, which may further complicate load alleviation methods.

The disclosed embodiments determine an optimized actuator setting to minimize loads (e.g., aerodynamic loads, weight loads, engine loads, structural loads, dynamic loads). In some embodiments, determining an optimized actuator setting is based on one or more signals. In some embodiments, the one or more signals are measured by one or more sensors included in the aircraft. Further, the disclosed embodiments generate one or more commands based on the determined optimized actuator setting. The one or more effector commands may cause actuation of one or more aircraft effectors.

In some embodiments, an aircraft of any of the disclosed embodiments may be simulated. For example, the aircraft may be in a simulated environment in a simulator (e.g., a simulator for flight training) or a virtual environment in a video game. Additionally or alternatively, in some embodiments, a display of an aircraft may be simulated. For example, the display (e.g., control margin display) may be in a simulated environment in a simulator (e.g., a simulator for flight training) or a virtual environment in a video game. A representation of the simulated display may be displayed on a display device (e.g., monitor, tablet, smartphone, computer screen, or any other display device) operatively connected to a processor configured to execute software code stored in a storage medium for performing flight controls operations, such as those further detailed below with reference to FIG. 5.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 2:
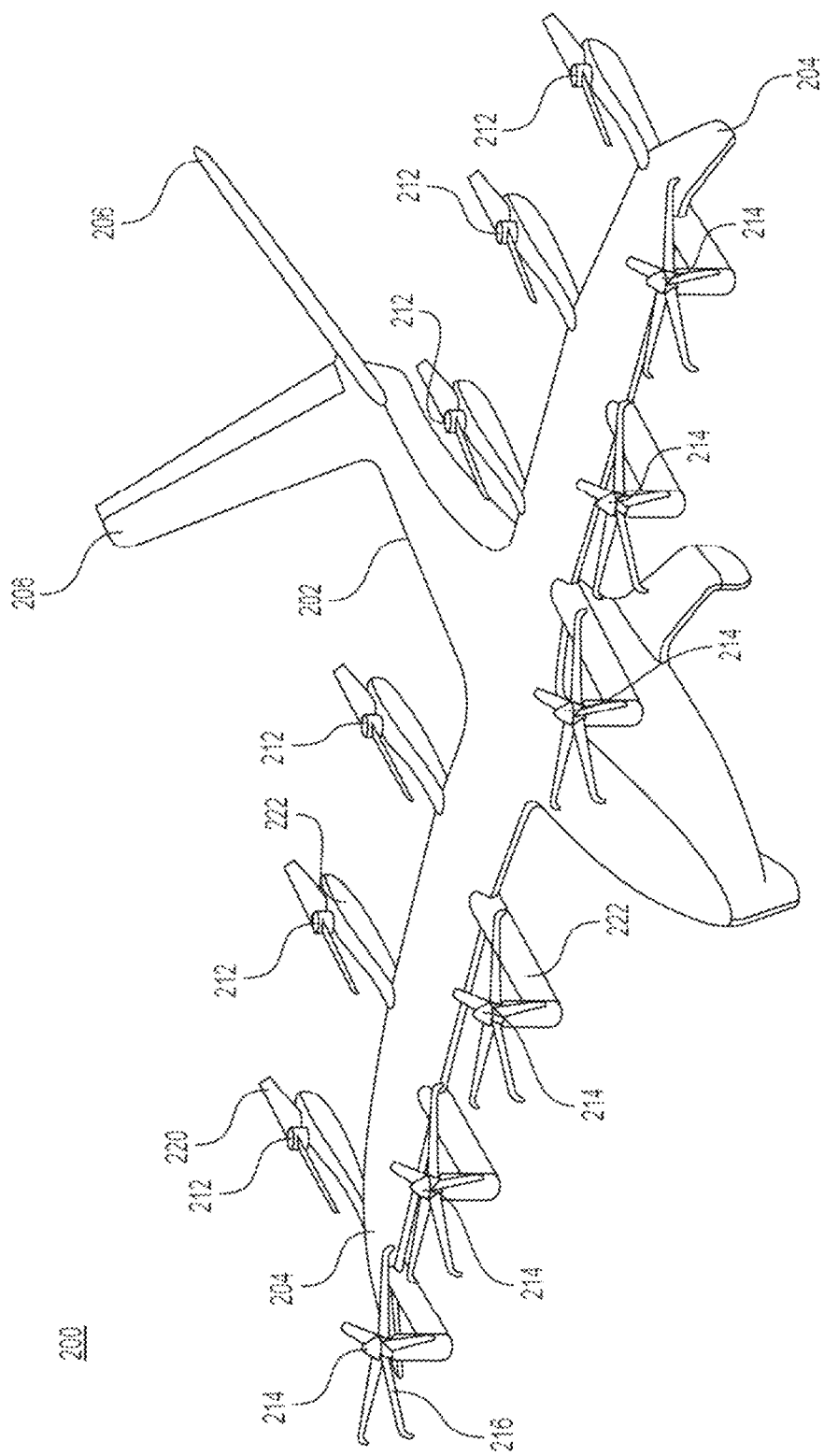
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable (e.g., configured to tilt or alter orientation) between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. For example, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked, for example while the aircraft is cruising, in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 (e.g., rotation point of propeller is behind a wing from a bird's eye view) and at least a portion of tilt propellers 114, 214 may be located forward of wings 104, 204 (e.g., rotation point of propeller is in front of a wing from a bird's eye view). In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—e.g., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps, ailerons, and/or flaperons (e.g., configured to perform functions of both flaps and ailerons). According to some embodiments, wings 104, 204 may have a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 112, 212 or tilt propellers 114, 214 may be canted relative to at least one other lift propeller 112, 212 or tilt propeller 114, 214, where canting refers to a relative orientation of the rotational axis of the lift propeller/tilt propeller about a line that is parallel to the forward-rearward direction, analogous to the roll degree of freedom of the aircraft.

In some embodiments, one or more lift propellers 112, 212 and/or tilt propellers 114, 214 may canted relative to a cabin of the aircraft, such that the rotational axis of the propeller in a lift configuration is angled away from an axis perpendicular to the top surface of the aircraft. For example, in some embodiments, the aircraft is a flying wing aircraft as shown in FIG. 4E below, and some or all of the propellers are canted away from the cabin.

Figure 3:
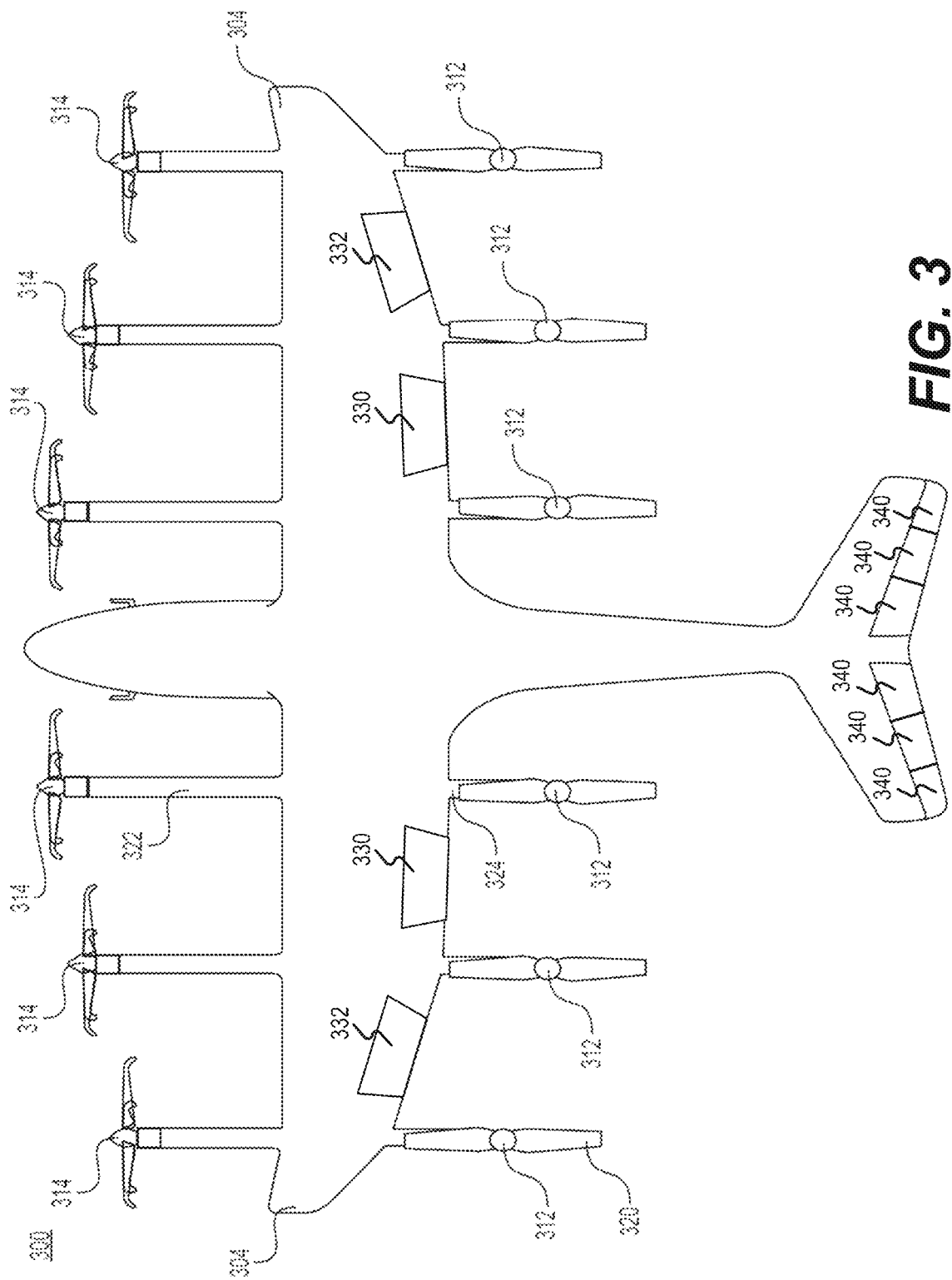
FIG. 3 shows an exemplary top plan view of a VTOL aircraft, consistent with disclosed embodiments.

FIG. 3 is an illustration of a top plan view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, forward electric propulsion systems may be mounted to wings 304 by booms 322. In some embodiments, aft electric propulsion systems may be mounted to wings 304 by booms 324. In some embodiments, a length of the rear end of the boom 324 from the wing 304 to a lift propeller (part of electric propulsion system 312) may comprise a similar rear end of the boom 324 length across the numerous rear ends of the booms. In some embodiments, the length of the rear ends of the booms may vary, for example, across the six rear ends of the booms. Further, FIG. 3 depicts an exemplary embodiment of a VTOL aircraft 300 with forward propellers (part of electric propulsion system 314) in a horizontal orientation for horizontal flight and aft propeller blades 320 in a stowed position for a forward phase of flight.

In some embodiments, a flight control system may include a system capable of controlling control surfaces and their associated actuators in an exemplary VTOL aircraft. In aircraft 300, the control surfaces may include, in addition to the propeller blades discussed earlier, flaperons 330, 332 and ruddervators 340. Flaperons 330, 332 may combine functions of one or more flaps, one or more ailerons, and/or one or more spoilers. Ruddervators 340 may combine functions of one or more rudders and/or one or more elevators. Additionally or alternatively, control surfaces may include separate rudders and elevators. Furthermore, in some embodiments, control surfaces may include any combination of: one or more flaperons, one or more spoilers, one or more morphing surfaces, one or more ailerons, one or more elevons, one or more flapervaterons, one or more ruddervators, one or more rudders, or one or more elevators. An elevon may combine functions of one or more elevators and/or one or more ailerons. A flapervateron may combine functions of one or more flaps, one or more ailerons, one or more spoilers, one or more elevators, one or more rudders, and/or one or more elevators. In aircraft 300, the actuators may include, in addition to the electric propulsion systems discussed earlier, control surface actuators (CSAs) associated with flaperons 330, 332 and ruddervators 340, as discussed further below.

Additionally or alternatively, in some embodiments, a flight control system may include a system (e.g., computerized, electrical, and/or electromechanical system) capable of controlling leading edge surfaces and their associated actuators in an exemplary VTOL aircraft. Examples of leading edge surfaces that may be included in the exemplary VTOL aircraft (e.g., aircraft 300) may include one or more slats, one or more Kreuger flaps, one or more droop flaps, one or more slotted flaps, one or more morphing surfaces, one or more spoilers, one or more variable camber leading edge devices, any combination of the foregoing, and/or any other suitable leading edge surface.

FIGS. 4A-4F are illustrations of a top plan view of exemplary VTOL aircrafts, consistent with embodiments of the present disclosure. There may be a number of design considerations (cost, weight, size, performance capability etc.) that may influence the number and/or combination of tilt and lift propellers in a VTOL aircraft. As further described below, the airspeed and bank angle of an aircraft may affect forces experienced by control surface and/or leading edge surface actuators. Therefore, the flight control system may adjust aircraft effectors or actuators in certain ways (e.g., those discussed in disclosed embodiments) to control the aircraft in a manner that reduces loads.

FIG. 4A illustrates an arrangement of electric propulsion units, consistent with embodiments of the present disclosure. Referring to FIG. 4A, the aircraft shown in the figure may be a top plan view of an exemplary aircraft (e.g., a VTOL aircraft). The aircraft may include twelve electric propulsion systems distributed across the aircraft. In some embodiments, a distribution of electric propulsion systems may include six forward electric propulsion systems (401, 402, 403, 404, 405, and 406) and six aft electric propulsion systems (407, 408, 409, 410, 411, and 412). In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 4B illustrates an alternate arrangement of electric propulsion units, consistent with embodiments of the present disclosure. Referring to FIG. 4B, the aircraft shown in the figure may be a top plan view of an exemplary aircraft (e.g., a VTOL aircraft). The aircraft may include eight electric propulsion systems distributed across the aircraft. In some embodiments, a distribution of electric propulsion systems may include four forward electric propulsion systems (413, 414, 415, and 416) and four aft electric propulsion systems (417, 418, 419, and 420). In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 4C illustrates an alternate arrangement of electric propulsion units, consistent with embodiments of the present disclosure. Referring to FIG. 4C, the aircraft shown in the figure may be a top plan view of an exemplary aircraft (e.g., a VTOL aircraft). The aircraft may include six electric propulsion systems distributed across the aircraft. In some embodiments, a distribution of electric propulsion systems may include a first set of four electric propulsion systems 421, 422, 423, and 424 coplanar in a first plane and a second set of two electric propulsion systems 425 and 426 coplanar in a second plane. In some embodiments, the first set of electric propulsion systems 421-424 may be operatively connected to tilt propellers and second set of electric propulsion systems 425 and 426 may be operatively connected to lift propellers. In other embodiments, the first set of electric propulsion systems 421-424 and the second set of aft electric propulsion systems 425 and 426 may all be operatively connected to tilt propellers.

FIG. 4D illustrates an alternate arrangement of electric propulsion units, consistent with embodiments of the present disclosure. Referring to FIG. 4D, the aircraft shown in the figure may be a top plan view of an exemplary aircraft (e.g., a VTOL aircraft). The aircraft may include four electric propulsion systems distributed across the aircraft. In some embodiments, a distribution of electric propulsion systems may include four coplanar electric propulsion systems 427, 428, 429, and 430. In some embodiments, all of the electric propulsion systems may be operatively connected to tilt propellers.

FIG. 4E illustrates an alternate arrangement of electric propulsion units, consistent with embodiments of the present disclosure. Referring to FIG. 4E, the aircraft shown in the figure may be a top plan view of an exemplary aircraft (e.g., a VTOL aircraft). The aircraft may include six electric propulsion systems distributed across the aircraft. For example, in some embodiments, the aircraft may include four forward electric propulsion systems 431, 432, 433, and 434 operatively connected to tilt propellers and the two aft ducted fans 435 and 436 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 4E, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

FIG. 4F illustrates an alternate arrangement of electric propulsion units, consistent with the embodiments of the present disclosure. Referring to FIG. 4F, the aircraft may be a top plan view of an exemplary aircraft. In some embodiments, the aircraft may include ducted fans 437, 438, 439 and 440 operably connected to the electric propulsion systems. In some embodiments the aircraft may include a bank of ducted fans on each wing of the aircraft and the bank of ducted fans may be connected to tilt together (e.g., between lift and forward thrust configuration). In some embodiments the aircraft includes a left and right front wing and a left and right rear wing. In some embodiments, each wing of the aircraft includes a bank of connected ducted fans. In some embodiments, each bank of connected ducted fans are tiltable (e.g., between lift and forward thrust), while in other embodiments only the bank of fans on the front wing(s) are tiltable.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems. In some embodiments, each electric propulsion systems may be fixed as clockwise (CW) type or counterclockwise (CCW) type, while in other embodiments, one or more electric propulsion systems may vary between clockwise (CW) and counterclockwise (CCW) rotation.

Figure 5:
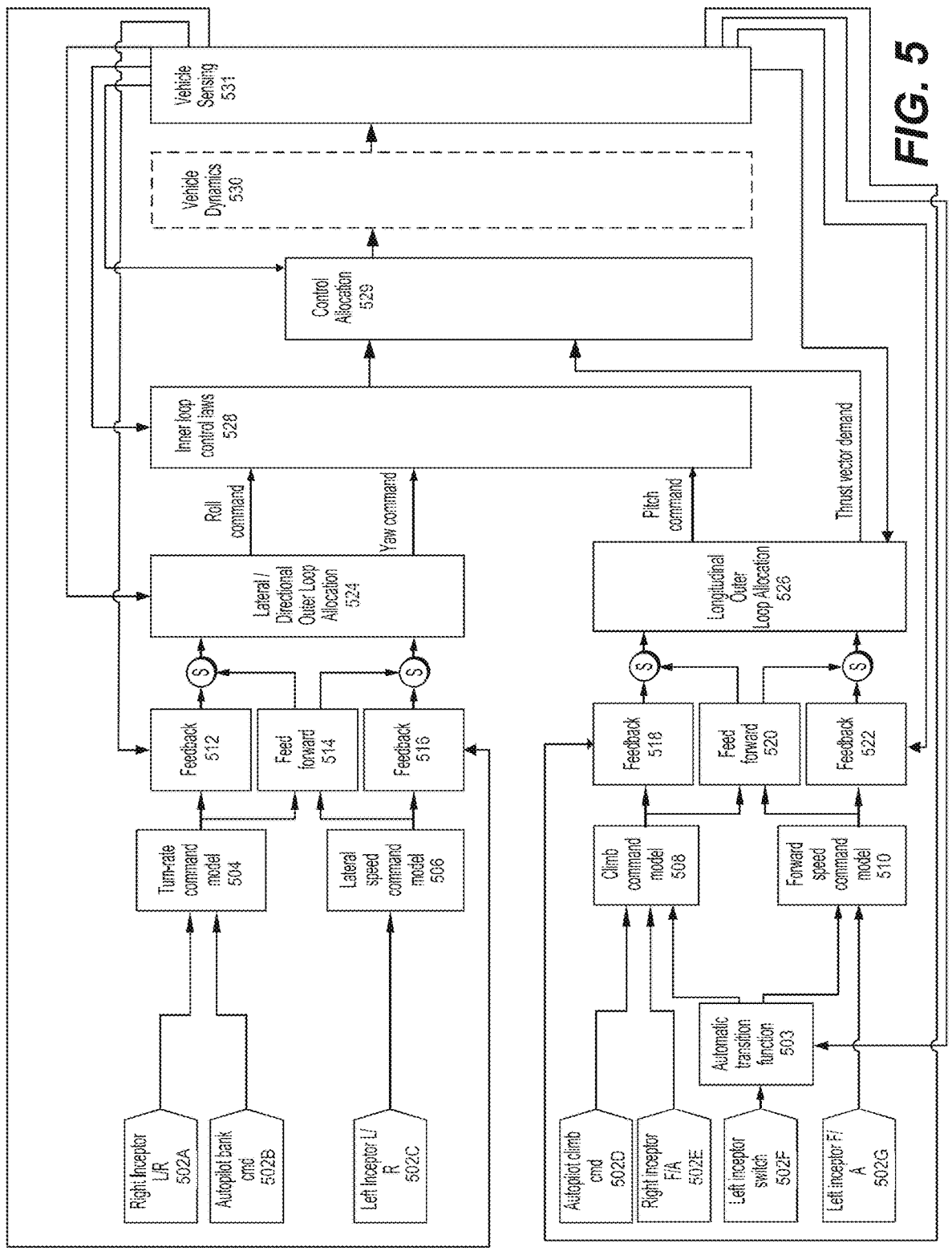
FIG. 5 illustrates a functional block diagram of an exemplary control system of an electric VTOL aircraft, consistent with disclosed embodiments.

FIG. 5 illustrates a functional block diagram of an exemplary control system 500 of an aircraft, consistent with disclosed embodiments. System 500 may be implemented by at least one processor (e.g., at least one a microprocessor-based controller) configured to execute software code stored in a storage medium (e.g., a computer-readable medium, a non-transitory computer-readable medium) to implement the functions described herein. System 500 may also be implemented in hardware, or a combination of hardware and software. System 500 may be implemented as part of a flight control system of the aircraft (e.g., flight control computer) and may be configured to perform a single step or sequence repeatedly until a desired or commanded outcome is achieved. It is to be understood that many conventional functions of the control system are not shown in FIG. 5 for ease of description. A flight control computer (FCC) may include a device configured to perform one or more operations (e.g., computational operations) for an aircraft, such as at least one processor and a memory component, which may store instructions executable by the at least one processor to perform the operations, consistent with disclosed embodiments.

System 500 further includes one or more storage mediums storing model(s), function(s), table(s), and/or any information for executing the disclosed processes. As further described below, any or each box indicating a command model (e.g., 504, 506, 508, and 510), feedback (512, 516, 518, and 522), feed forward (514, 520), Outer Loop Allocation (524, 526), inner loop control laws 528, and control allocation 529 may represent or include module(s), script(s), function(s), application(s), and/or program(s) that are executed by processor(s) and/or microprocessor(s) of system 500. It is appreciated that the complexity and interconnectedness of the functional block diagram of FIG. 5 would be impossible, or at least impractical, to effectively implement by a human user, especially when considering that these functionalities are implemented while the aircraft is flying (including taking off or landing).

In some embodiments, control system 500 may be configured based on one or more flight control laws. Flight control law may comprise a set of algorithms, models, and/or rules configured to govern a behavior of an aircraft (e.g., control or influence one or more effectors of the aircraft) in response to one or more pilot inputs and external factors. In some embodiments, flight control laws may be configured to achieve at least one of desired flight characteristics, stability, or performance. For example, flight control laws may be configured to ensure stability and controllability of an aircraft by controlling how the aircraft responds to at least one of one or more pilot inputs, vehicle dynamics (e.g., disturbances, such as turbulence, gusts, etc.), or changes in flight conditions (e.g., altitude, airspeed, angle of attack).

System 500 may detect one or more inputs, such as from a pilot input device configured to receive at least one pilot input and generate or influence a signal. A pilot input may be generated by and/or received from an input device or mechanism of the aircraft, such as a button, a switch, a stick, a slider, an inceptor, or any other device configured to generate or influence a signal based on a physical action from a pilot. For example, a pilot input device may include one or more of right inceptor(s) (e.g., moving right inceptor left/right 502A and/or right inceptor forward/aft 502E), left inceptor(s) (e.g., moving left inceptor left/right 502C and/or left inceptor forward/aft 502G), and/or left inceptor switch 502F. In some embodiments, a pilot input device may include an interface with an autopilot system (e.g., display screen(s), switch(es), button(s), lever(s), and/or other interface(s)). Optionally, system 500 may further detect inputs from an autopilot system, such as autopilot roll command 502B, autopilot climb command 502D, and/or other command(s) to control the aircraft.

In some embodiments, the one or more inputs may include at least one of a position and/or rate of a right inceptor and/or a left inceptor, signals received (e.g., response type change commands, trim inputs, reference inputs, backup control inputs, etc.) from switches on the inceptors, measurements of aircraft state and environmental conditions (e.g., measured load factor, airspeed, roll angle, pitch angle, actuator states, battery states, aerodynamic parameters, temperature, gusts, etc.) based on data received from one or more sensors of the aircraft, obstacles (e.g., presence or absence of other aircraft and/or debris), and an aircraft mode (e.g., taxiing on the ground, takeoff, in-air). For example, right inceptor L/R 502A may comprise a lateral position and/or rate of a right inceptor (e.g., an inceptor positioned to the right of another inceptor and/or an inceptor positioned on the right side of a pilot area), autopilot roll command 502B may comprise a roll signal received in autopilot mode, left inceptor L/R 502C may comprise a lateral position and/or rate of a left inceptor (e.g., an inceptor positioned to the left of another inceptor and/or an inceptor positioned on the left side of a pilot area), autopilot climb command 502D may comprise a climb signal received in autopilot mode, right inceptor F/A 502E may comprise a longitudinal position and/or rate of the right inceptor, left inceptor switch 502F may comprise a signal from a switch for enabling or disabling automatic transition function 503, and left inceptor F/A 502G may comprise a longitudinal position and/or rate of the left inceptor.

Each input may include data as listed above (e.g., signals from switches, measurements of aircraft state, aircraft mode, etc.). Actuator states may include actuator hardware limits, such as travel limits, speed limits, response time limits, etc., and can include actuator health indicators that may indicate deteriorations in actuator performance that may limit a given actuator's ability to satisfy actuator commands. Actuator states may be used to determine the bounds (e.g., minimum/maximum values) for individual actuator commands. Battery states may correspond to remaining energy of the battery packs of the aircraft, which may be monitored when control allocation 529 considers balancing battery pack energy states. Aerodynamic parameters may be parameters derived from aerodynamic and acoustic modeling and can be based on the actuator Jacobian matrices and actuator states. Each input received from an inceptor may indicate a corresponding adjustment to an aircraft's heading or power output.

Command models 504, 506, 508 and 510 may be configured to determine a shape (e.g., aggressiveness, slew rate, damping, overshoot, etc.) of an ideal aircraft response. For example, each command model of command models 504, 506, 508 and 510 may be configured to receive and interpret at least one of inputs 502A, 502B, 502C, 502D, 502E, 502F and 502G and, in response, compute a corresponding change to an aircraft's orientation, heading, and propulsion, or a combination thereof using an integrator (not pictured). In some embodiments, right inceptor L/R 502A and autopilot roll command 502B may be fed into turn-rate command model 504, left inceptor L/R 502C may be fed into lateral speed command model 506, autopilot climb command 502D and right inceptor F/A 502E may be fed into climb command model 508, and left inceptor F/A 502G may be fed into forward speed command model 510. In some embodiments, an output from automatic transition function 503 may be fed into at least one of climb command model 508 or forward speed command model 510. For example, based on receiving an enable signal from left inceptor switch 502F, automatic transition function 503 may automatically determine at least one of a climb signal or a forward speed signal for transmission to at least one of climb command model 508 or forward speed command model 510.

Turn-rate command model 504 may be configured to output a desired position and/or turn-rate command and may also be configured to compute a desired heading of the aircraft to be assumed when the inceptor is brought back to a centered position (e.g., in detent). Lateral speed command model 506 may be configured to output a desired position and/or lateral speed command. Climb command model 508 may be configured to output at least one of a desired altitude, vertical speed, or vertical acceleration command. Forward speed command model 510 may be configured to output at least one of a desired position, longitudinal speed, or longitudinal acceleration command. In some embodiments, one or more of the command models may be configured to output an acceleration generated in response to changes in speed command. For example, climb command model 508 may be configured to output a vertical acceleration generated in response to a change in vertical speed command.

Feed forward 514 and 520 may each receive as input one or more desired changes (e.g., desired position, speed and/or acceleration) from corresponding command models 504, 506, 508 or 510 as well as data received from the one or more aircraft sensors (e.g., airspeed, vehicle orientation, vehicle load factor, measured acceleration, vehicle mass and inertia, air density, altitude, aircraft mode, etc.) and may be configured to output, for each desired change, a corresponding force to accomplish the desired change. In some embodiments, feed forward 514 and 520 may be configured to determine the corresponding force using simplified models of aircraft dynamics. For example, based on a known (e.g., a stored value of) or determined mass of the aircraft, feed forward 514 and 520 may be configured to determine a force to cause the aircraft to follow a desired acceleration command. In some embodiments, feed forward 514 and 520 may be configured to use a model predicting an amount of drag on the vehicle produced as a function of speed in order to determine a force required to follow a desired speed command signal.

In some embodiments, feed forward 520 may comprise a control surface regulation function. For example, feed forward 520 may be configured to receive, as input for the control surface regulation function, aircraft data (e.g., airspeed, load factor of one or more actuators) and/or one or more pilot commands (e.g., acceleration command). Additionally or alternatively, in some embodiments, a separate feed forward may comprise a control surface regulation function. For example, the separate feed forward (not depicted) may be a flight condition feed forward and may receive, as input, aircraft data (e.g., airspeed, load factor of one or more actuators) and/or one or more pilot commands (e.g., acceleration command). In some embodiments, the control surface regulation function may directly send data to control allocation 529. For example, the control surface regulation function may, either as part of feed forward 520 or as a separate feed forward, send data (e.g., control surface position) directly to control allocation 529.

Figure 7:
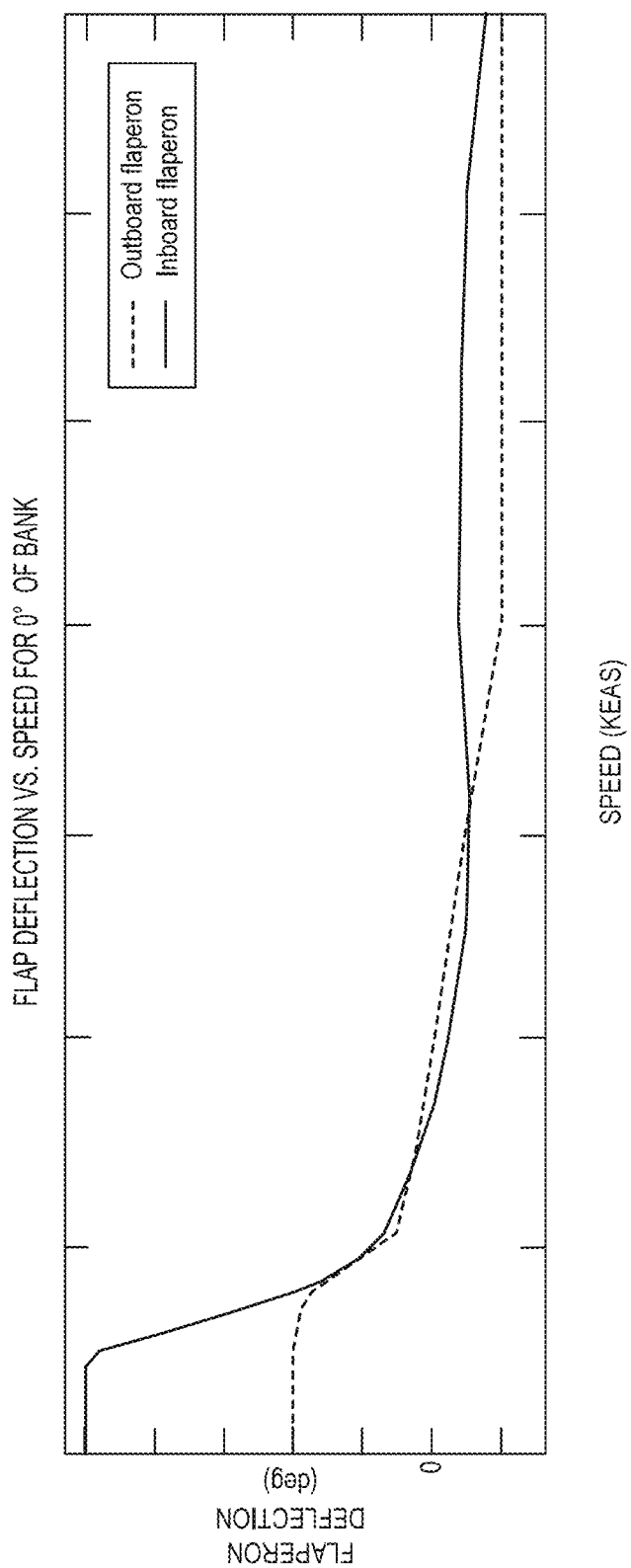
FIG. 7 illustrates exemplary flaperon deflections, according to some embodiments.

In some embodiments, the control surface regulation function may include a prioritization scheme. A prioritization scheme may refer to a systematic computerized (e.g., algorithmic) approach or set of rules used to determine an optimized variable or set of variables. In some embodiments, a prioritization scheme may include at least one of a weighted algorithm, a cost function, or a data structure. For example, the control surface regulation function may include a weighted algorithm configured to determine an optimized control surface position setting that minimizes the continuous torque of the actuator of the control surface while still providing one or more outputs satisfying one or more constraints, such as by providing sufficient lift capability (e.g., outputting lift that reaches a threshold and/or is within a particular range). Additionally or alternatively, the control surface regulation function may include a data structure (e.g., lookup table, schedule) comprising one or more data pairs (e.g., inboard flaperons 330 deflection and air speed, outboard flaperons 332 deflection and air speed, as depicted in FIG. 7).

Figure 9A:
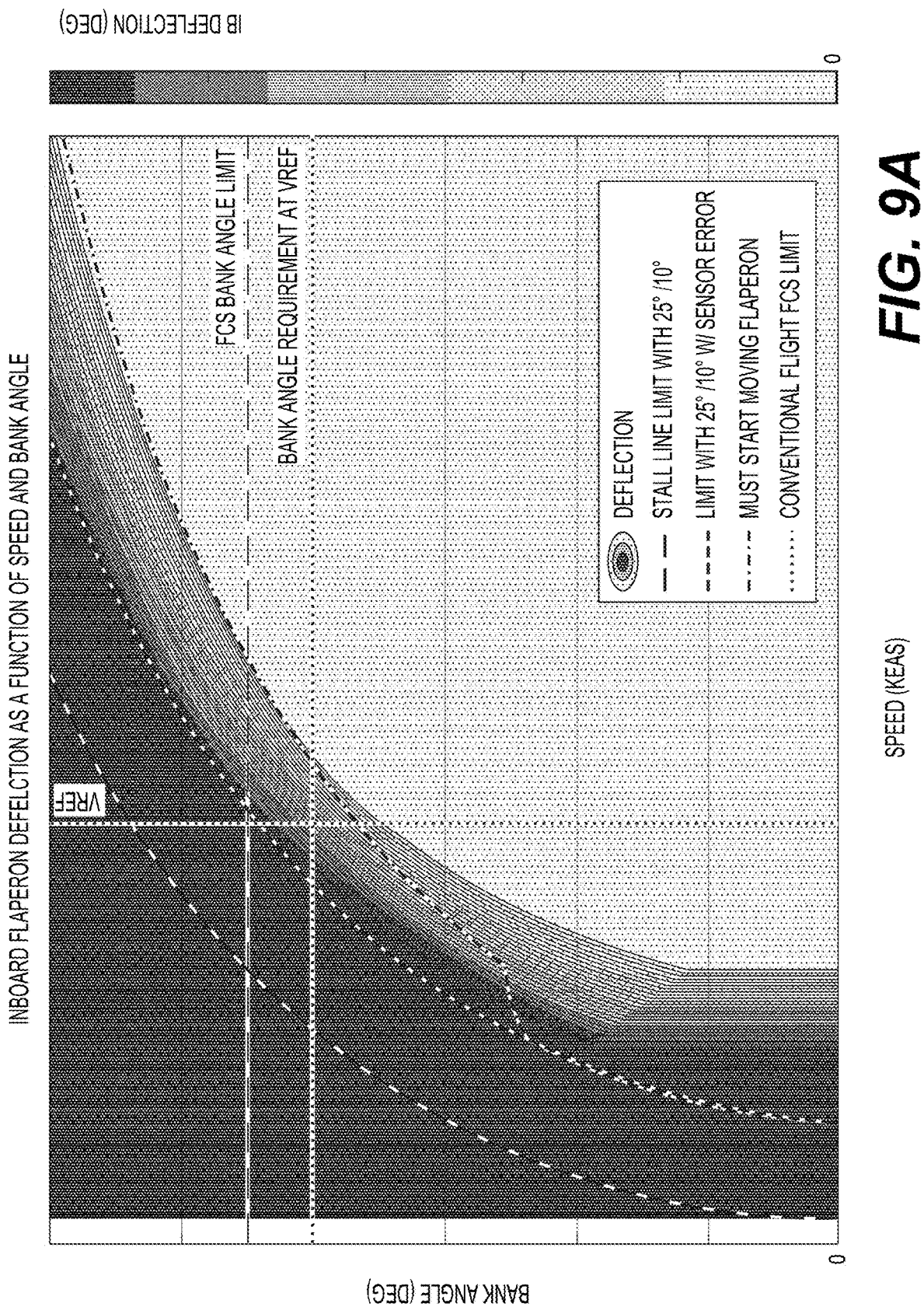
FIGS. 9A and 9B illustrate exemplary flaperon deflection implementing flaperon regulation, according to some embodiments.
Figure 9B:
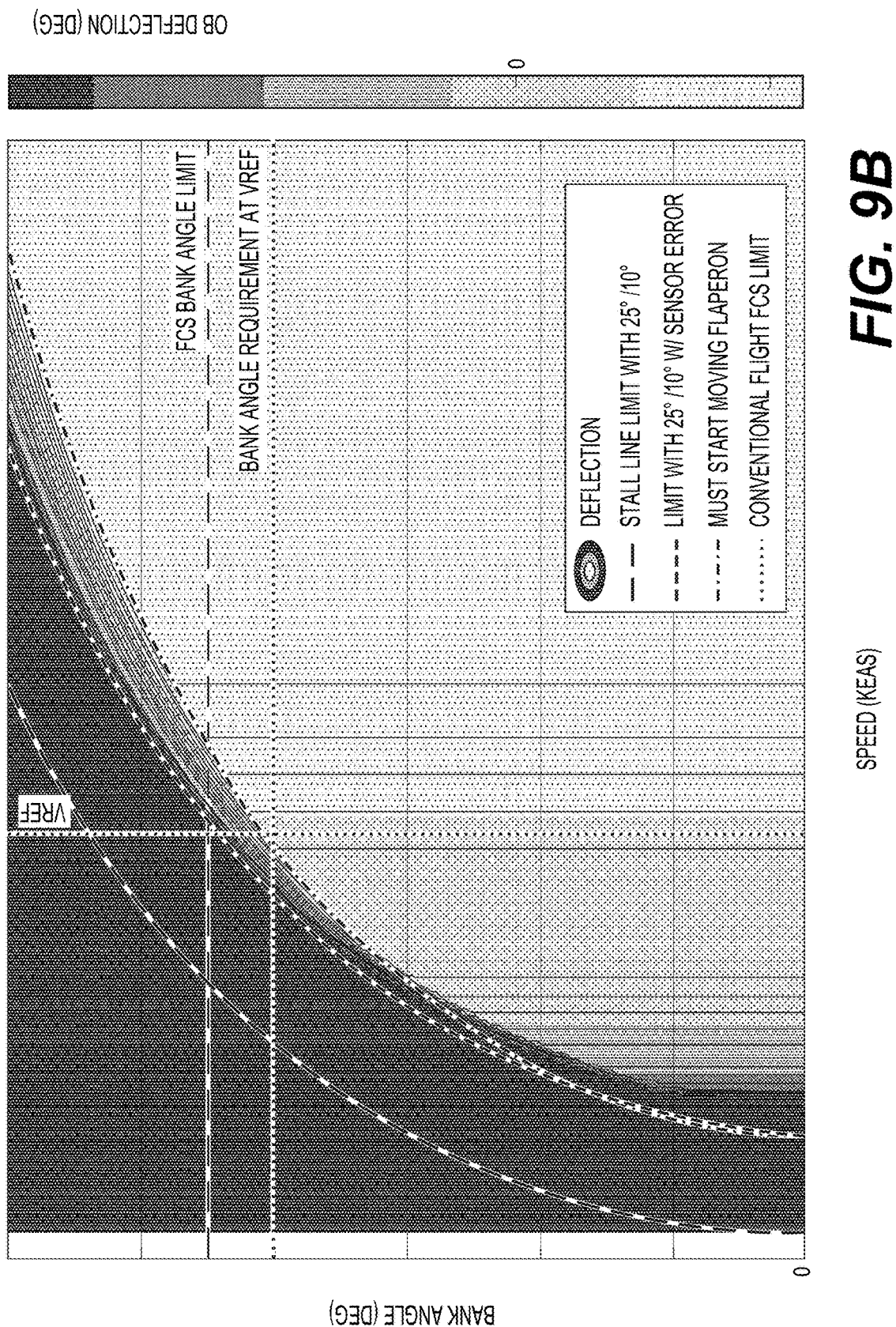

In some embodiments, the control surface position regulation function may be configured to determine a control surface position based on one or more measured state variables. Additionally or alternatively, in some embodiments, the control surface position regulation function may be configured to determine a leading edge surface position (e.g., an updated, preferred, optimized, and/or improved leading edge surface position) based on one or more measured state variables. The one or more measured state variables may include an airspeed, a bank angle, an ambient temperature, an actuator temperature, an actuator hinge moment, a current actuator hinge position, a commanded actuator hinge position, any variable aircraft or aircraft component trait, and/or any combination thereof. The ambient temperature may refer to the temperature of the air around the aircraft and may be used to determine a density of the air around the aircraft. For example, the control surface position regulation function may be configured to determine a control surface position based on an airspeed (e.g., as depicted in FIG. 7) or based on an airspeed and a bank angle (e.g., as depicted in FIGS. 9A and 9B).

In some embodiments, the prioritization scheme may be configured to determine a control surface position based on a flight mode, in addition or as an alternative to one or more measured state variables. For example, the control surface position regulation function may determine at least one control surface position (e.g., flaperon deflection of 5 degrees) based on first measured state variables for an aircraft in hover mode and may determine a same or a different control surface position (e.g., flaperon deflection of 0 degrees) based on second measured state variables (e.g., corresponding to the first measured state variables) for an aircraft in forward flight.

In some embodiments, the prioritization scheme may be configured to prioritize actuating a first actuator in a first flight mode (e.g., when the aircraft is in a first flight mode) and to prioritize actuating a second actuator in a second flight mode (e.g., when the aircraft is in a second flight mode). For example, the control surface position regulation function may be configured to prioritize minimizing torque of inboard flaperons (e.g., 330 of FIG. 3) while the aircraft is in hover mode and to prioritize minimizing torque of outboard flaperons (e.g., 332 of FIG. 3) while the aircraft is in forward flight mode.

In some embodiments, the prioritization scheme may be configured to determine a control surface position further based on a maximum lift coefficient. A maximum lift coefficient (CLmax) may refer to the highest lift coefficient (CL) value that an aircraft wing can achieve (e.g., due to the positioning of control surfaces and/or leading edge surfaces on the aircraft wing) before the airflow over the wing begins to separate and the wing stalls (e.g., dramatic loss of lift and a sharp increase in drag). For example, the control surface position regulation function may be configured to determine a control surface position (e.g., flaperon deflection) that does not stall the aircraft (e.g., a control surface position at which CL is below CLmax). In some embodiments, CLmax for an aircraft wing may be determined via testing or experimentation. For example, the CL for an aircraft wing across a range of angles may be determined via testing in a wind tunnel, and the maximum value of CL for a given angle may be CLmax.

In some embodiments, the prioritization scheme may be configured to determine an optimized control surface position for each of a plurality of actuators. For example, the control surface position regulation function may be configured to determine an optimized control surface position for each control surface of an aircraft. Further, the control surface position regulation function may determine a first set of optimized control surface positions for a first type of control surface (e.g., inboard flaperons 330 of FIG. 3) and a second set of optimized control surface positions for a second type of control surface (e.g., outboard flaperons 332 of FIG. 3). In some embodiments, one or more positions of the first set of optimized control surface positions may be the same as one or more positions of the second set of optimized control surface positions.

In some embodiments, the prioritization scheme may be continuous. A continuous prioritization scheme may include a prioritization scheme configured to output a continuum or range of values (e.g., angle values), rather than, for example, two or three different discrete angle values. For example, at least one processor (e.g., FCC) may be configured to dynamically run and/or update the control surface position regulation function (e.g., while the aircraft is in flight), which may cause frequent changes (e.g., optimized changes) to control surface positions during flight, which would be impossible for a pilot to do with the same degree of technical benefit (e.g., reduction in strain to components). Further, by way of non-limiting example, for an aircraft including low aspect ratio wings, the prioritization scheme may provide additional benefit in determining one or more optimal control surface and/or leading edge surface positions to minimize continuous torque on control surface actuators while maintaining sufficient lift (e.g., not stalling).

In some embodiments, the at least one processor may use received measurements (e.g., airspeed, bank angle, ambient temperature, actuator hinge moment, actuator temperature) as inputs to the control surface position regulation function to update or modify the control surface position regulation function. For example, the at least one processor may be configured to determine, based on the received measurements, that a control surface position (e.g., flaperon deflection) needs to be decreased to reduce the torque experienced by the actuator without significantly affecting control surface performance (e.g., lift capability, flight envelope adherence). Further, the control surface position regulation function may include a control surface position for each measured state variable (e.g., as depicted in FIG. 7) and/or combination of measured state variables (e.g., as depicted in FIGS. 9A and 9B).

In some embodiments, the prioritization scheme may be configured to detect if a state of an actuator exceeds a predetermined threshold (e.g., force threshold, torque threshold, temperature threshold, airspeed threshold, and/or angle and airspeed combination threshold). In some embodiments, the predetermined threshold may include at least one of a maximum torque of an actuator or a maximum temperature of an actuator. A maximum torque of an actuator may include a maximum continuous torque an actuator can provide continuously, a 10 minute torque limit, and/or an absolute maximum torque. If an actuator exceeds one or more of the aforementioned maximum torques, the risk of damage and/or failure of the actuator may be significant.

For example, the control surface position regulation function may be configured to receive, from one or more sensors of the aircraft, actuator state data (e.g., actuator hinge moment, actuator torque, actuator temperature, actuator position) and may be configured to compare the received actuator state data to a corresponding predetermined threshold. If the control surface position regulation function determines that at least one received actuator state datum exceeds a corresponding predetermined threshold, the control surface position regulation function may be configured to generate a warning signal. For example, the control surface position regulation function may send the warning signal to an FCC of the aircraft or may alert the pilot of the aircraft via a warning (e.g., visual warning, auditory warning, haptic warning) that the actuators associated with the actuator state data exceeding the predetermined threshold may be at risk for or are damaged. Further, in some embodiments, the prioritization scheme may be configured to automatically control an actuator associated with actuator state data exceeding a predetermined threshold. For example, the control surface position regulation function may send a signal to control allocation 529 to automatically (e.g., without direct pilot input) control an actuator to decrease a flaperon deflection so that the actuator controlling a particular flaperon experiences a lower hinge moment (thereby applying less torque to maintain a flaperon position).

In some embodiments, the prioritization scheme may be configured to receive an override command. For example, the control surface position regulation function may be configured to receive an override command from a pilot of an aircraft to turn off or deactivate the control surface position regulation function. Based on (e.g., in response to) receiving the override command, the control surface position regulation function may cease outputting data to control allocation 529.

In some embodiments, the prioritization scheme may be configured to determine one or more optimal control surface positions based on (e.g., in response to, using information from) one or more disturbances. A disturbance may include a gust/gust load, a bird strike, hail, or any other external factor an aircraft may experience during flight. For example, based on (e.g., in response to, using information from) a sensor detecting and/or predicting a gust ahead of the aircraft, the control surface position regulation function may be configured to determine one or more optimal control surface positions to maintain control surface actuator torque below a maximum torque, which may be a same or a different position at the same aircraft state variables (e.g., airspeed, bank angle, load factor) that is not experiencing a disturbance.

Feedback 512, 516, 518, and 522 may each receive as input the one or more desired changes (e.g., desired position, speed and/or acceleration) from command models 504, 506, 508 and 510 as well as data received from Vehicle Sensing 531 indicative of Vehicle Dynamics 530. For example, sensed Vehicle Dynamics 530 may comprise the physics and/or natural dynamics of the aircraft, and Vehicle Sensing 531 sensor measurements may capture how the aircraft moves in response to pilot inputs, propulsion system outputs or ambient conditions. In some embodiments, Vehicle Dynamics 530 may represent the control of different flight elements (e.g., electric propulsion system(s) and/or control surfaces) and the corresponding effect on the flight elements and aircraft dynamics. Additionally or alternatively, data received from Vehicle Sensing 531 may include error signals generated, by one or more processors, based on exogenous disturbances (e.g., gust causing speed disturbance). In some embodiments, feedback 512, 516, 518 and 522 may be configured to generate feedback forces (e.g., at an actuator) based on the received error signals. For example, feedback 512, 516, 518 and 522 may generate feedback forces with the intent of counteracting the effect(s) of external disturbances. Additionally or alternatively, feedback 512, 516, 518 and 522 may be configured to generate feedback forces based on modeling errors. For example, if an incorrect aircraft mass is input into either feed forward 514 or 520, the aircraft may accelerate faster or slower than the desired change. Based on determining a difference between the desired acceleration and the measured acceleration, one or more processors may generate an error signal (e.g., included in Vehicle Sensing 531) which may be looped into feedback 512, 516, 518 or 522 to determine an additional force needed to correct the error.

In some embodiments, feedback 512, 516, 518 or 522 may be disabled. For example, in response to losing position and/or ground speed feedback due to disruption of global position system (GPS) communication, system 500 may be configured to operate without feedback 512, 516, 518 or 522 until GPS communication is reconnected.

In some embodiments, feedback 512, 516, 518 or 522 may receive as input a plurality of measurements as well as a trust value for each measurement indicating whether the measurement is valid. For example, one or more processors of system 500 may assign a Boolean (true/false) value for each measurement used in system 500 to indicate that the measurement is trustworthy (e.g., yes) or that the measurement may be invalid (e.g., no). Based on one or more processors identifying a measurement as invalid, feedback 512, 516, 518 or 522 may omit that measurement (e.g., measured state variable) for further processing. For example, in response to one or more processors identifying a heading measurement as invalid, feedback 512, 516, 518 or 522 may omit subsequent heading measurements in determining feedback force(s).

In some embodiments, feedback 512, 516, 518 or 522 may determine one or more feedback forces based on actuator state information received from one or more sensors (e.g., included in Vehicle Sensing 531). For example, in response to actuator state information indicating that there is a failure of an actuator, one or more processors of system 500 may update one or more processes of System 500 and determine an alternative command to achieve the desired change. For example, one or more processors of system 500 may adjust one or more model(s), function(s), algorithm(s), table(s), input(s), parameter(s), threshold(s), and/or constraint(s) based on (e.g., in response to) a change in state (e.g., failure) of an actuator (or other aircraft components, such as an engine or battery, for other examples). Alternative command(s) (e.g., yaw, pitch, roll, thrust, or torque) may be determined based on the adjustment(s). Additionally or alternatively, in response to actuator state information indicating that one or more actuators are at a maximum value, one or more processors of system 500 may update one or more processes of system 500 (e.g., as described above) and determine an alternative command to achieve the desired change.

Total desired forces may be calculated based on outputs of feedback 512, 516, 518 and 522 and feed forward 514 and 520. For example, one or more processors of system 500 may calculate a desired turn-rate force by summing the outputs of feedback 512 and feed forward 514. Additionally or alternatively, one or more processors of system 500 may calculate a desired lateral force by summing the outputs of feedback 516 and feed forward 514. Additionally or alternatively, one or more processors of system 500 may calculate a desired vertical force by summing the outputs of feedback 518 and feed forward 520. Additionally or alternatively, one or more processors of system 500 may calculate a desired longitudinal force by summing the outputs of feedback 522 and feed forward 520.

Lateral/Directional Outer Loop Allocation 524 and Longitudinal Outer Loop Allocation 526 may each be configured to receive as input one or more desired forces and data received from Vehicle Sensing 531 (e.g., airspeed, vehicle orientation, vehicle load factor, measured acceleration, vehicle mass and inertia, indications of working/failed actuators, air density, altitude, aircraft mode, whether the aircraft is in the air or on the ground, weight on wheels, etc.). Based on the inputs, Outer Loop Allocation 524 and 526 may be configured to command roll, command yaw, command pitch, demand thrust, or output a combination of different commands/demands in order to achieve the one or more desired forces.

Lateral/Directional Outer Loop Allocation 524 may receive as input a desired turn-rate force and/or a desired lateral force and may command roll or command yaw. In some embodiments, Lateral/Directional Outer Loop Allocation 524 may determine output based on a determined flight mode. A flight mode may be determined using pilot inputs (e.g., a selected mode on an inceptor) and/or sensed aircraft information (e.g., an airspeed). For example, Lateral/Directional Outer Loop Allocation 524 may determine a flight mode of the aircraft using at least one of a determined (e.g., sensed or measured) airspeed or an input received at a pilot inceptor button (e.g., an input instructing the aircraft to fly according to a particular flight mode). In some embodiments, Lateral/Directional Outer Loop Allocation 524 may be configured to prioritize a pilot inceptor button input over measured airspeed in determining the flight mode (e.g., the pilot inceptor button is associated with a stronger weight or higher priority than a measured airspeed). In some embodiments, Lateral/Directional Outer Loop Allocation 524 may be configured to blend (e.g., using weighted summation) the determined airspeed and pilot inceptor button input to determine the flight mode of the aircraft. In a hover flight mode, Lateral/Directional Outer Loop Allocation 524 may achieve the desired lateral force with a roll command (e.g., roll angle, roll rate) and may achieve the desired turn-rate force with a yaw command. In some embodiments, such as in hover flight mode, the aircraft may be configured to not be able to accelerate outside a predetermined hover envelope (e.g., hover speed range). In a forward-flight mode (e.g., horizontal flight), Lateral/Directional Outer Loop Allocation 524 may achieve the desired lateral force with a yaw command and may achieve the desired turn-rate force with a roll command. In forward flight mode, Lateral/Directional Outer Loop Allocation 524 may be configured to determine output based on sensed airspeed. In a transition between hover flight mode and forward flight mode, Lateral/Directional Outer Loop Allocation 524 may achieve desired forces using a combination of a roll command and a yaw command.

Longitudinal Outer Loop Allocation 526 may receive as input a desired vertical force and/or a desired longitudinal force and may output at least one of a pitch command (e.g., pitch angle) or a thrust vector demand. A thrust vector demand may include longitudinal thrust (e.g., mix of nacelle tilt and front propeller thrust) and vertical thrust (e.g., combined front and rear thrust). In some embodiments, Longitudinal Outer Loop Allocation 526 may determine output based on a determined flight mode. For example, in a hover flight mode, Longitudinal Outer Loop Allocation 526 may achieve a desired longitudinal force by lowering a pitch attitude and by using longitudinal thrust, and may achieve a desired vertical force with vertical thrust. In a forward-flight mode, Longitudinal Outer Loop Allocation 526 may achieve a desired longitudinal force with longitudinal thrust (e.g., front propeller thrust). In a cruise flight mode, Longitudinal Outer Loop Allocation 526 may achieve a desired vertical force by commanding pitch (e.g., raising pitch attitude) and demanding thrust (e.g., increasing longitudinal thrust).

Inner loop control laws 528 may be configured to determine moment commands based on at least one of a roll command, yaw command, or pitch command from Lateral/Directional Outer Loop Allocation 524 or Longitudinal Outer Loop Allocation 526. In some embodiments, Inner loop control laws 528 may be dependent on sensed Vehicle Dynamics (e.g., from Vehicle Sensing 531). For example, Inner loop control laws 528 may be configured to compensate for disturbances at the attitude and rate level in order to stabilize the aircraft. Additionally or alternatively, Inner loop control laws 528 may consider periods of natural modes (e.g., phugoid modes) that affect the pitch axis, and may control the aircraft appropriately to compensate for such natural modes of the vehicle. In some embodiments, inner loop control laws 528 may be dependent on vehicle inertia.

Inner loop control laws 528 may determine moment commands using one or more stored dynamics models that reflect the motion characteristics of the aircraft (e.g., the aerodynamic damping and/or inertia of the aircraft). In some embodiments, the Inner loop control laws 528 may use a dynamic model (e.g., a low order equivalent system model) to capture the motion characteristics of the aircraft and determine one or more moments that will cause the aircraft to achieve the commanded roll, yaw, and/or pitch. Some embodiments may include determining (e.g., by inner loop control laws 528 or other component) a moment command based on at least one received command (e.g., a roll command, yaw command, and/or pitch command) and a determined (e.g., measured) aircraft state. For example, a moment command may be determined using a difference in the commanded aircraft state and the measured aircraft state. By way of further example, a moment command may be determined using the difference between a commanded roll angle and a measured roll angle. As described below, Control Allocation 529 may control the aircraft (e.g., through flight elements) based on the determined moment command(s). For example, Control Allocation 529 may control (e.g., transmit one or more commands to) one or more electric propulsion system(s) of the aircraft, including tilt actuator(s), electric engine(s), and/or propeller(s). Control Allocation 529 may further control one or more control surface(s) of the aircraft (e.g., control surfaces, such as flaperons 330, 332 and ruddervators 340 shown in FIG. 3), including flaperon(s), ruddervator(s), aileron(s), spoiler(s), rudder(s), and/or elevator(s).

While the embodiment shown in FIG. 5 includes both Inner Loop Control Laws 528 and Outer Loop Allocations 524 and 526, in some embodiments the flight control system may not include Outer Loop Allocations 524 and 526. Therefore, a pilot inceptor input may create roll, yaw, pitch, and/or thrust commands. For example, a right inceptor may control roll and pitch and a left inceptor and/or pedal(s) may control yaw and thrust.

Control Allocation 529 may accept as inputs one or more of force and moment commands, data received from the one or more aircraft sensors, envelope protection limits, regulation parameter, scheduling parameter, and optimizer parameters. Control Allocation 529 may be configured to determine, based on the inputs, actuator commands by minimizing an objective function that includes one or more primary objectives, such as meeting (e.g., responding to, satisfying, addressing, providing output based upon) commanded aircraft forces and moments, and one or more secondary, which can include minimizing acoustic noise and/or optimizing battery pack usage.

In some embodiments, control allocation 529 may be configured to compute the limits of individual actuator commands based on the actuator states and envelope protection limits. Envelope protection limits may include one or more boundaries that the aircraft should operate within to ensure safe and stable flight. In some embodiments, envelope protection limits may be defined by one or more of speed, altitude, angle of attack, or load factor. For example, envelope protection limits may include one or more bending moments and/or one or more load constraints. In some embodiments, control allocation 529 may use envelope protection limits to automatically adjust one or more control surfaces or control settings. Doing so may prevent the aircraft from undesirable scenarios such as stalling or structural strain or failure. In normal operation, the minimum command limit for a given actuator may include the maximum of: the minimum hardware based limit and the minimum flight envelope limit; and the maximum command limit for a given actuator may include the minimum of: the maximum hardware based limit and the maximum flight envelope limit. In the case of an actuator failure, the command limits for the failed actuator correspond to the failure mode.

Control allocation 529 sends commands to one or more flight elements to control the aircraft. The flight elements will move in accordance with the controlled command. Various sensing systems and associated sensors as part of Vehicle Sensing 531 may detect the movement of the flight elements and/or the dynamics of the aircraft and provide the information to Feedback 512, 516, 518, 522, Outer Loop allocation 524 and 526, Inner Loop Control laws 528, and Control Allocation 529 to be incorporated into flight control.

In some embodiments, control allocation 529 may be configured to send commands to one or more flight elements to control the aircraft based on received signals not including direct pilot commands (though sent commands may still be based on pilot commands). For example, control allocation 529 may be configured to send commands to one or more control surface actuators to adjust the position of the actuators based on data received from the control surface position regulation function. Additionally or alternatively, control allocation 529 may be configured to send commands to control each of a plurality of actuators independently. For example, based on the received optimized control surface positions from the control surface position regulation function, control allocation 529 may control each actuator independently so that each actuator may move its associated control surface to the optimized control surface position. Further, each control surface may have a same or different optimized control surface position. For example, inboard flaperons 330 and outboard flaperons 332 may have different deflections based on the same set of measured state variables, and control allocation 529 may command the inboard flaperon actuators independently and/or differently than the outboard flaperon actuators.

In some embodiments, one or more actuators may be configured to control a control surface or a leading edge surface. For example, control allocation 529 may generate and/or send actuator commands to actuators of control surfaces (e.g., flaperons) based on (e.g., in response to, using information from) data received from the control surface position regulation function. Additionally or alternatively, in some embodiments, control allocation 529 may cease generating and sending actuator commands based on (e.g., in response to, using information from) the control surface position regulation function after receiving an override command from a pilot of the aircraft. For example, control allocation, after receiving an override command from a pilot of the aircraft, may cease automatic control of the actuators of the control surfaces as informed by the control surface position regulation function.

As described above, Vehicle Sensing 531 may include one or more sensors to detect vehicle dynamics. For example, Vehicle Sensing 531 may capture how the aircraft moves in response to pilot inputs, propulsion system outputs or ambient conditions. Additionally or alternatively, Vehicle Sensing 531 may detect an error in the aircraft's response based on exogenous disturbances (e.g., gust causing speed disturbance). Further, Vehicle Sensing 531 may include one or more sensors to detect propeller speed, such as a magnetic sensor (e.g., Hall effect or inductive sensor) or an optical sensor (e.g., a tachometer) configured to detect the rotor speed of the aircraft engine (and thereby the speed of the propeller). Vehicle sensing 531 may include one or more sensors to detect a nacelle tilt angle (e.g., a propeller rotation axis angle between a lift configuration (e.g., FIG. 2) and forward thrust configuration (e.g., FIG. 1)). For example, one or more magnetic sensors (e.g., Hall effect or inductive sensor), position displacement sensors, linear displacement sensors, and/or other sensor(s) associated with the tilt actuator may detect a tilt angle (e.g., relative to the aircraft and/or wing), which may be provided to system 500. Further, one or more pitot tubes, accelerometers, and/or gyroscopes may detect a pitch angle of the aircraft, which may be provided to system 500. In some embodiments, Vehicle Sensing 531 may combine tilt angle sensor measurements and aircraft pitch measurements to determine an overall nacelle tilt angle for the propellers. Vehicle sensing 531 may include one or more sensors configured to detect an engine torque and/or thrust, such as one or more current sensors or voltage sensors, strain gauges, load cells, and/or propeller vibration sensors (e.g., accelerometers).

Vehicle sensing 531 may include one or more sensors configured to detect vehicle dynamics, such as acceleration and/or pitch orientation sensors (e.g., accelerometer(s), 3-axis accelerometer(s), gyroscope(s), 3-axis gyroscope(s), and/or tilt-position sensors to determine angles of engines) and airspeed sensors (e.g., pitot tube sensors). Vehicle sensing 531 may further include one or more inertial measurement units (IMUs) to determine an aircraft state based on these measurements. An aircraft state may refer to forces experienced by, an orientation of, a position of (e.g., altitude), and/or movement of, the aircraft. For example, an aircraft state may include at least one of: a position of the aircraft (e.g., a yaw angle, roll angle, pitch angle, and/or any other orientation across one or two axes), velocity of the aircraft, angular rate of the aircraft (e.g., roll, pitch, and/or yaw rate), and/or an acceleration of the aircraft (e.g., longitudinal, lateral and/or vertical acceleration), or any physical characteristic of the aircraft or one of its components.

In some embodiments, Vehicle Sensing 531 may include an inertial navigation system (INS) and/or an air data and/or an attitude heading reference systems (ADAHRS). The inertial navigation systems (INS) and/or an air data and attitude heading reference systems (ADAHRS) may include one or more inertial measurement units (IMUs) and corresponding sensors (e.g., accelerometers, gyroscopes, three-axis gyroscopes, and/or three-axis accelerometers). In some embodiments, the INS and/or ADAHRS may filter and/or otherwise process sensor measurements to determine an aircraft state (e.g., acceleration or angular rate). For example, in some embodiments, the INS and/or ADAHRS may determine angular rates based on gyroscope measurements and may determine acceleration based on measurements from an accelerometer.

Figure 6:
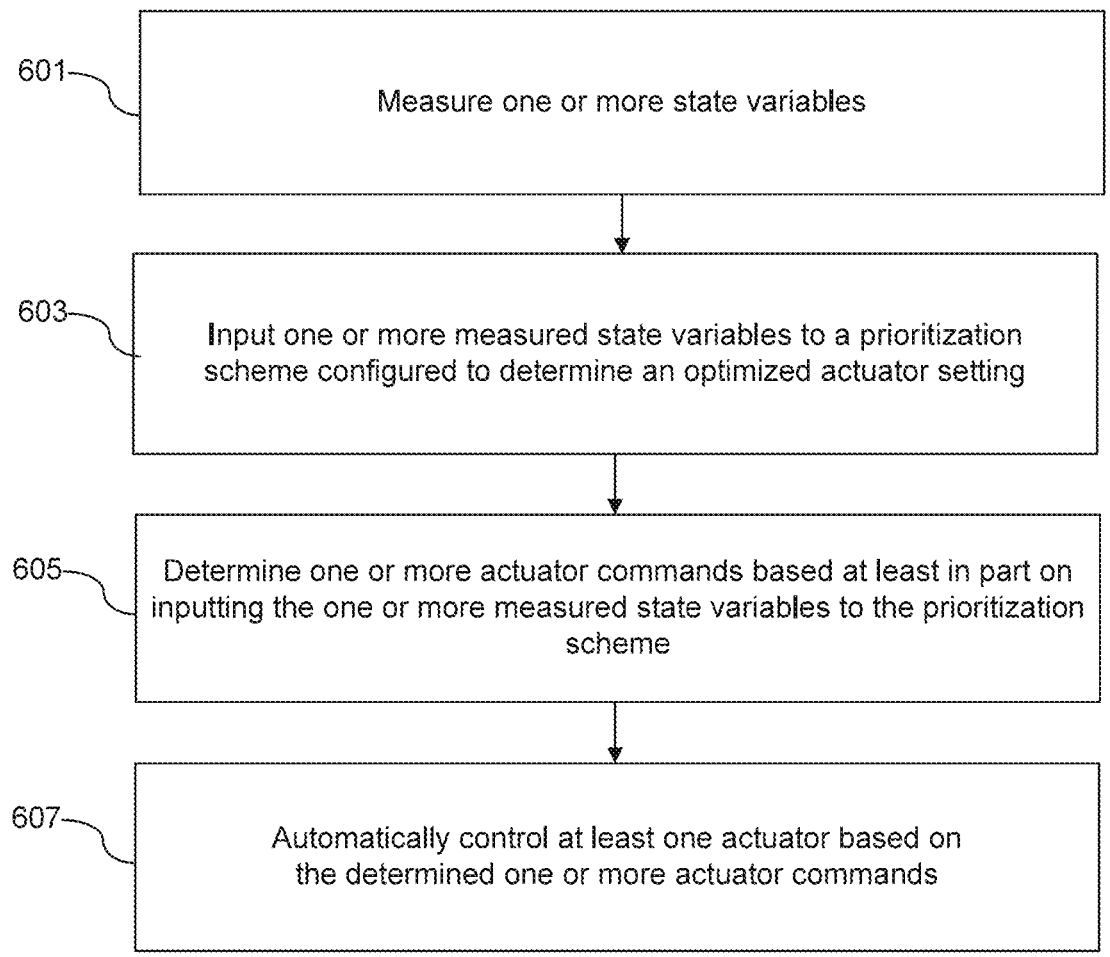
FIG. 6 shows an exemplary computer-implemented method for controlling an aircraft, consistent with disclosed embodiments.

FIG. 6 is an exemplary block diagram for a computer-implemented method 600 for controlling an aircraft, consistent with disclosed embodiments. It is appreciated that the steps of the exemplary methods depicted in FIG. 6 would be impossible, or at least impractical, to effectively implement by a human user, especially when considering that these functionalities are implemented frequently (e.g., constantly, continually), while the aircraft is flying (including taking off or landing), and/or dynamically based on (e.g., in response to) received signals (e.g., aircraft sensors, changing state measurements, pilot input devices). In general, it may be understood that any/all steps of the exemplary methods of FIG. 6 may be performed or executed by at least one processor (e.g., FCS), such as according to one or more instructions stored on a computer-readable medium (e.g., non-transitory computer-readable medium).

At step 601, at least one processor (e.g., FCS) may measure one or more state variables. For example, one or more sensors may measure one or more aircraft state variables. The one or more state variables may include at least one of an airspeed, a bank angle, an ambient temperature, an actuator temperature, an actuator hinge moment, a current actuator hinge position, a commanded actuator hinge position, or any variable aircraft or aircraft component trait, such as those discussed above in relation to FIG. 5. In some embodiments, the at least one processor may use a control surface regulation position function to determine one or more actuator commands, such as by using the steps described below. The one or more sensors may be configured to send the measured state variables to the control surface position regulation function.

At step 603, at least one processor (e.g., FCS) may input one or more measured state variables to a prioritization scheme configured to determine an optimized actuator setting. For example, the control surface position regulation function may be configured to receive the measured aircraft state variables and determine one or more optimized control surface positions based on the measured aircraft state variables.

At step 605, at least one processor (e.g., FCS) may determine one or more actuator commands based at least in part on inputting one or more measured state variables to a prioritization scheme. For example, the control surface position regulation function may send the optimized control surface positions to control allocation (e.g., 529 of FIG. 5) to generate one or more actuator commands to move the control surfaces according to the optimized control surface positions.

At step 607, at least one processor (e.g., FCS) may automatically control at least one actuator based on determined one or more actuator commands. For example, the actuators, based on (e.g., in response to) receiving actuator commands from control allocation (e.g., 529 of FIG. 5), may automatically move based on (e.g., according to) the received actuator commands.

By implementing computer-implemented method 600, the required torques of actuators for control surfaces is controlled and lowered. Therefore, smaller, lighter actuators may be used in place of larger, heavier actuators that may be designed to support higher torques for longer periods of time. Thus, the weight of an aircraft (e.g., eVTOL aircraft) can be decreased, increasing flight performance (e.g., flight range) and capability (e.g., weight capacity).

FIG. 7 illustrates exemplary deflections for inboard and outboard flaperons of the aircraft, consistent with disclosed embodiments. Each curve shows what the deflection may be for each flaperon at a certain speed of the aircraft as determined by the control surface position regulation function. For example, the control surface position regulation function may determine a differing flaperon deflection for outboard flaperons (e.g., outboard flaperons 332 of FIG. 3) than inboard flaperons (e.g., inboard flaperons 330 of FIG. 3).

Figure 8A:
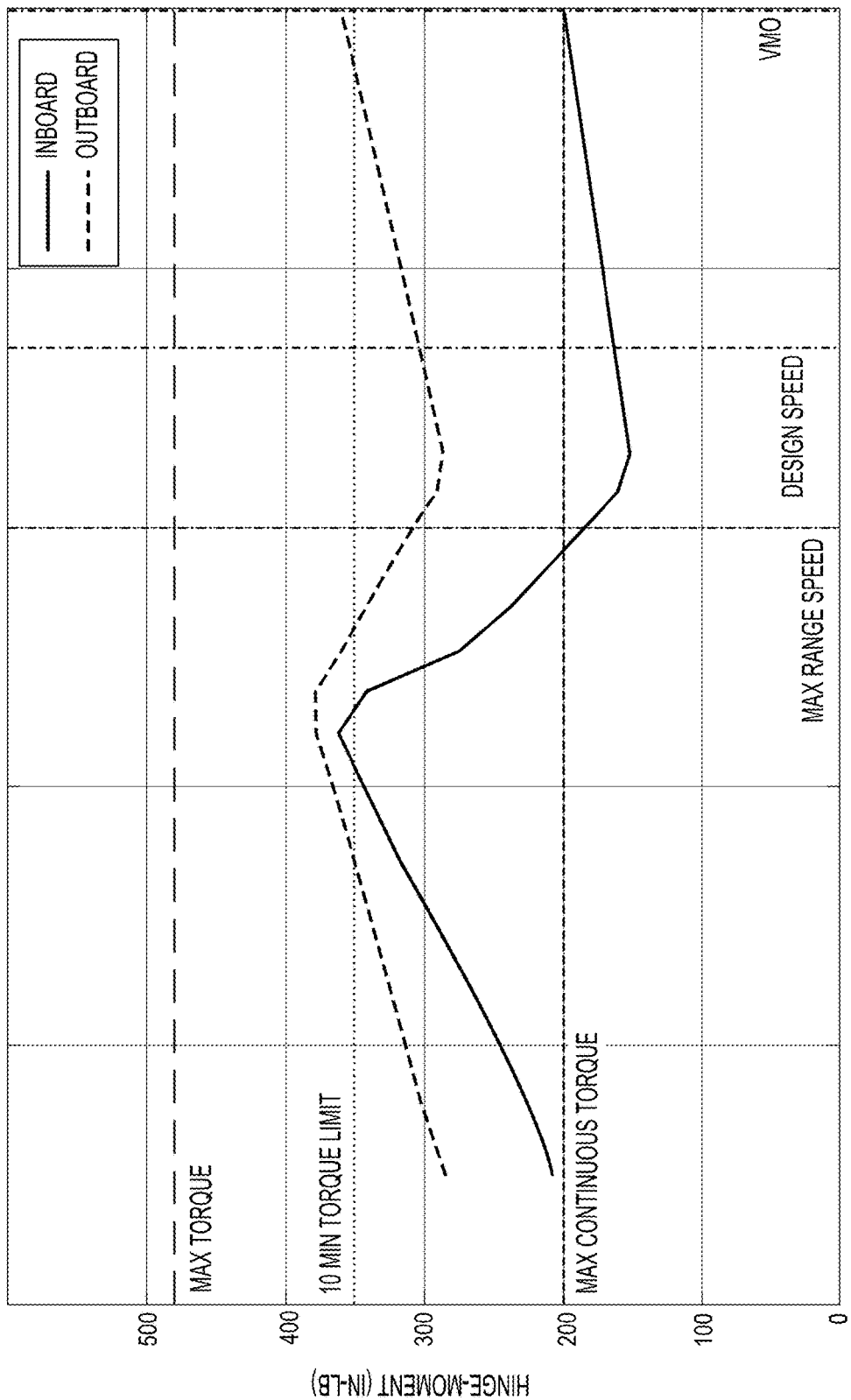
FIGS. 8A and 8B illustrate exemplary hinge-moment levels for different scenarios, according to some embodiments.
Figure 8B:
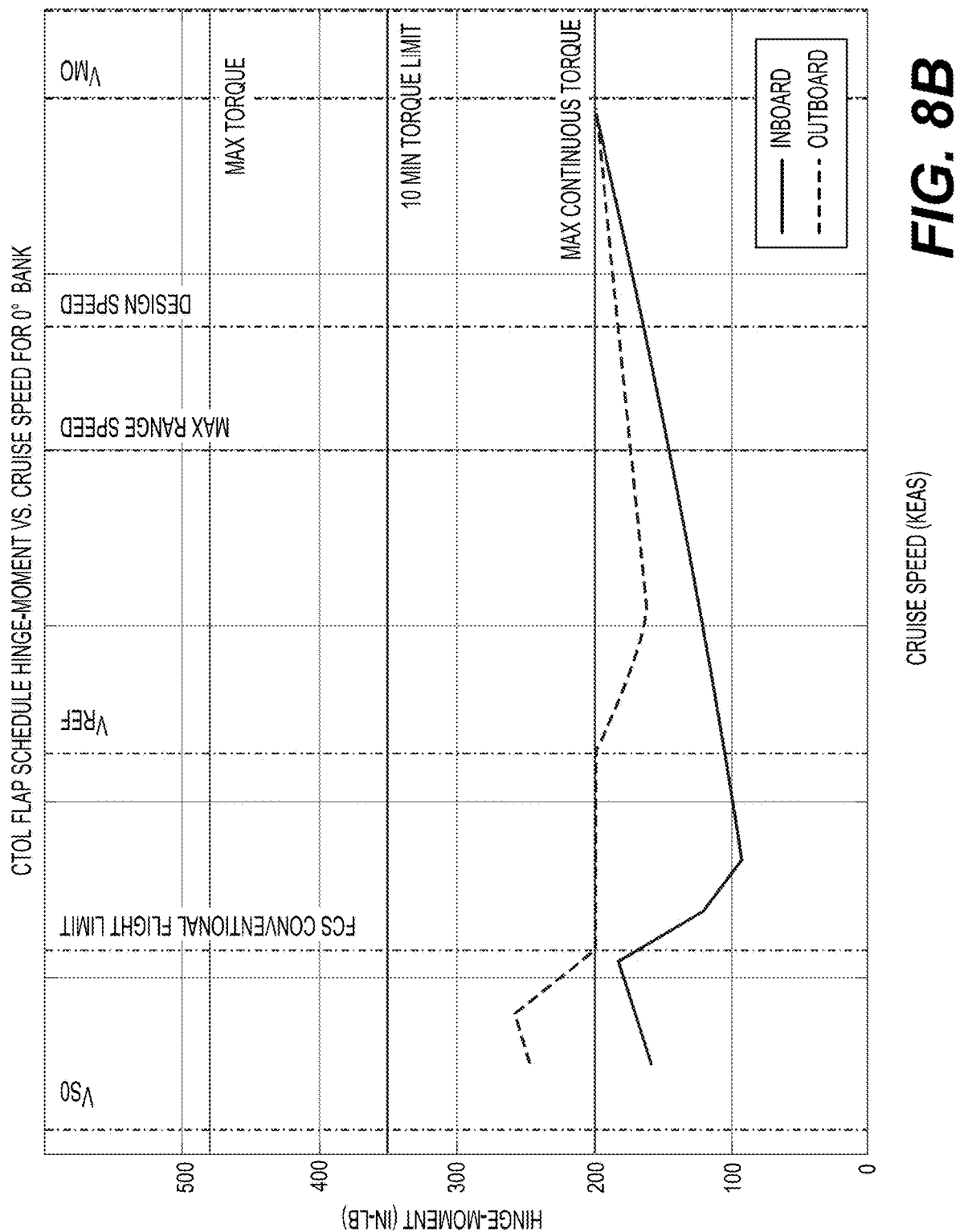

FIG. 8A illustrates exemplary hinge-moment levels without the control surface position regulation function and FIG. 8B illustrates exemplary hinge-moment levels with the control surface position regulation function, consistent with disclosed embodiments. Without the control surface position regulation function, actuator hinge-moment levels may significantly violate the max continuous torque as well as the exemplary 10 minute torque limit. With the control surface position regulation function, overall hinge-moment levels may be reduced for steady-state flight. By maintaining actuator hinge-moments below the maximum torques, the actuators may safely function as intended with an increased lifespan.

FIG. 9A illustrates exemplary inboard flaperon deflection as a function of speed and load and FIG. 9B illustrates exemplary outboard flaperon deflection as a function of speed and load, consistent with disclosed embodiments. In some embodiments, the control surface position regulation function may be defined by a nominal schedule for 0 degrees bank with increased deflections as needed. In some embodiments, deflections may be increased to maintain a certain lift coefficient margin from lift coefficient maximum at a given bank angle. In some embodiments, deflection may be increased to meet a roll deflection requirement. In some embodiments, hinge-moment may not be tracked.

In some embodiments, the prioritization scheme may be configured to control one or more actuators to not move. For example, the control surface position regulation function may determine that the optimized control surface position is maintaining the current control surface position (e.g., do not deflect flaperon). Additionally or alternatively, in some embodiments, the control surface position regulation function may be configured to control one or more control surface positions based on load factors. For example, the control surface position regulation function may be configured to determine an optimized flaperon setting as a function of load factors (e.g., one or more of speed, bank angle, air density, etc.).

In some embodiments, the prioritization scheme may be configured to determine a 0 degree bank control surface position versus airspeed. For example, the control surface position regulation function may be configured to determine a 0 degree bank flaperon deflection versus speed. Additionally or alternatively, the control surface position regulation function may be configured to minimize drag subject to a continuous hinge-moment for speeds down to Vref. In some embodiments, the control surface position regulation function may be configured to increase deflection near Vref to reach a max deflection (used to define stall speed) with sufficient margin to stall while respecting continuous hinge-moment limits. In some embodiments, the control surface position regulation function may be configured to determine a maximum deflection (e.g., due to hinge-moments) and maximum load factor/angle-of-attack/CLmax that the aircraft can sustain (e.g., should use within one or more constraints) as a function of speed. In some embodiments, the control surface position regulation function may be configured to determine a max attainable bank angle from a max attainable CLmax/load factor (e.g., load factor in vertical axis). In some embodiments, the control surface position regulation function may be configured to determine a largest bank angle/angle-of-attack (e.g., accounting for sensing error and margin) at which surfaces can start moving from their position based on the determined 0 degree bank flaperon deflection versus speed and hit max deflection by the time the aircraft has reached its max allowed bank/angle-of-attack. In some embodiments, the control surface position regulation function may be configured to determine a minimum deflection to ensure a given margin to CLmax for a desired load factor. In some embodiments, the control surface position regulation function may compute a deflection for a given load factor and speed by taking a maximum as defined above.

In some embodiments, the flight control system may be configured to monitor actuator temperature. While the control surface position regulation function may significantly reduce scenarios where control surface actuators need to operate at higher loads, it may not eliminate all long duration pilot actions which may cause damage to actuators and reduction in control of which the pilot may not be aware (e.g., because the aircraft is over actuated). In some embodiments, monitoring actuator temperature may comprise using one or more thermal sensors in, on, thermally connected to, or within a threshold distance of, the actuators. For example, once an actuator reaches or exceeds a threshold temperature, the control surface position regulation function may generate a warning signal indicating that the actuator may be to need to be repaired or replaced. In some embodiments, monitoring actuator temperature may comprise monitoring actuator current and estimating temperature based on an actuator thermal model.

In some embodiments, in response to detecting that a temperature of an actuator has surpassed a predetermined threshold, the flight control system may be configured to output a warning to the pilot. In some embodiments, in response to detecting that a temperature of an actuator has surpassed a predetermined threshold, the flight control system may adjust (e.g., increase or decrease) a speed of the aircraft to reduce hinge-moments.

Additional aspects of the present disclosure may be further described via the following clauses:

1. A computer-implemented method of controlling an aircraft, comprising:
   measuring one or more state variables of the aircraft;
   inputting the one or more measured state variables to a prioritization scheme configured to determine an optimized actuator setting;
   determining one or more actuator commands based at least in part on inputting the one or more measured state variables to the prioritization scheme; and
   automatically controlling at least one actuator of the aircraft based on the determined one or more actuator commands.
2. The computer-implemented method of clause 1, wherein the state variables comprise at least one of:
   an airspeed;
   a bank angle;
   an ambient temperature;
   an actuator temperature; or
   an actuator hinge moment.
3. The computer-implemented method of clause 1 or 2, wherein determining the one or more actuator commands occurs while the aircraft is in flight.
4. The computer-implemented method of any one of clauses 1-3, wherein the prioritization scheme comprises at least one of:
   a weighted algorithm;
   a cost function; or
   a data structure.
5. The computer-implemented method of any one of clauses 1-4, wherein determining the one or more actuator commands is further based on a flight mode.
6. The computer-implemented method of clause 5, wherein the prioritization scheme is configured to:
   prioritize actuating at least one first actuator in a first flight mode; and
   prioritize actuating at least one second actuator in a second flight mode.
7. The computer-implemented method of any one of clauses 1-6, wherein determining the one or more actuator commands is further based on a maximum lift coefficient.
8. The computer-implemented method of any one of clauses 1-7, further comprising: detecting a state of the at least one actuator; and generating a warning signal if the state exceeds a predetermined threshold.
9. The computer-implemented method of clause 8, wherein the predetermined threshold comprises at least one of:
   a maximum torque of the at least one actuator; or
   a maximum temperature of the at least one actuator.
10. The computer-implemented method of clause 8 or 9, further comprising:
    automatically controlling the at least one actuator if the state exceeds a predetermined threshold.
11. The computer-implemented method of any one of clauses 1-10, further comprising:
    in response to receiving a command to override automatic control, ceasing automatic control of the at least one actuator.
12. The computer-implemented method of any one of clauses 1-11, wherein the at least one actuator is configured to control a control surface or leading edge surface of the aircraft.
13. The computer-implemented method of clause 12, wherein the control surface or leading edge surface comprises at least one of:
    a flaperon;
    a slat;
    a Kreuger flap;
    a droop flap;
    a slotted flap;
    a spoiler;
    a morphing surface;
    an aileron;
    an elevon;
    a flapervateron;
    a ruddervator;
    a rudder; or
    an elevator.
14. The computer-implemented method of any one of clauses 1-13, wherein automatically controlling the at least one actuator comprises independently controlling each of a plurality of actuators.
15. The computer-implemented method of any one of clauses 1-14, wherein the prioritization scheme is continuous.
16. A system for controlling an aircraft, comprising:
    at least one processor; and
    at least one non-transitory computer-readable medium storing instructions that, when executed by the at least one processor, cause the at least one processor to perform operations comprising:
    measuring one or more state variables of the aircraft;
    inputting the one or more measured state variables to a prioritization scheme configured to determine an optimized actuator setting;
    determining one or more actuator commands based at least in part on inputting the one or more measured state variables to the prioritization scheme; and automatically controlling at least one actuator of the aircraft based on the determined one or more actuator commands.

17. The system of clause 16, wherein the state variables comprise at least one of:
   an airspeed;
   a bank angle;
   an ambient temperature;
   an actuator temperature; or
   an actuator hinge moment.

18. The system of clause 16 or 17, wherein determining the one or more actuator commands occurs while the aircraft is in flight.

19. The system of any one of clauses 16-18, wherein the prioritization scheme comprises at least one of:
   a weighted algorithm;
   a cost function; or
   a data structure.

20. The system of any one of clauses 16-19, wherein determining the one or more actuator commands is further based on a flight mode.

21. The system of clause 20, wherein the prioritization scheme is configured to:
   prioritize actuating at least one first actuator in a first flight mode; and
   prioritize actuating at least one second actuator in a second flight mode.

22. The system of any one of clauses 16-21, wherein determining the one or more actuator commands is further based on a maximum lift coefficient.

23. The system of any one of clauses 16-22, wherein the operations further comprise:
   detecting a state of the at least one actuator; and
   generating a warning signal if the state exceeds a predetermined threshold.

24. The system of clause 23, wherein the predetermined threshold comprises at least one of:
   a maximum torque of the at least one actuator; or
   a maximum temperature of the at least one actuator.

25. The system of clause 23 or 24, wherein the operations further comprise:
   automatically controlling the at least one actuator if the state exceeds a predetermined threshold.

26. The system of any one of clauses 16-25, wherein the operations further comprise:
   in response to receiving a command to override automatic control, ceasing automatic control of the at least one actuator.

27. The system of any one of clauses 16-26, wherein the at least one actuator is configured to control a control surface or leading edge surface of the aircraft.

28. The system of clause 27, wherein the control surface or leading edge surface comprises at least one of:
   a flaperon;
   a slat;
   a Kreuger flap;
   a droop flap;
   a slotted flap;
   a spoiler;
   a morphing surface;
   an aileron;
   an elevon;
   a flapervateron;
   a ruddervator;
   a rudder; or
   an elevator.

29. The system of any one of clauses 16-28, wherein automatically controlling the at least one actuator comprises independently controlling each of a plurality of actuators.

30. The system of any one of clauses 16-29, wherein the prioritization scheme is continuous.

31. A computer-readable medium storing instructions which, when executed by at least one processor, cause the at least one processor to perform the computer-implemented method of any one of clauses 1-15.

32. An aircraft comprising the system of any one of clauses 16-30.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/of" unless specifically directed otherwise. As used herein, unless specifically stated otherwise, being "based on" may include being dependent on, being interdependent with, being associated with, being defined at least in part by, being derived from, being influenced by, or being responsive to. As used herein, "related to" may include being inclusive of, being expressed by, being indicated by, or being based on. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein. It is also intended that the sequence of steps shown in figures is only for illustrative purposes and is not intended to be limited to any particular sequence of steps. As such, those skilled in the art can appreciate that these steps can be performed in a different order while implementing the same method.

What is claimed is:

1. A computer-implemented method of controlling an aircraft, comprising:
   measuring, using at least one hardware processor, one or more state variables of the aircraft, wherein the one or more state variables comprise an actuator hinge moment;
   inputting, using the at least one hardware processor, the one or more measured state variables to a prioritization scheme configured to determine an optimized actuator setting;
   determining, using the at least one hardware processor, one or more actuator commands associated with the determined optimized actuator setting based at least in part on inputting the one or more measured state variables to the prioritization scheme; and
   automatically moving, using the at least one hardware processor, at least two actuators each associated with a different control surface or leading edge surface of the aircraft based on the determined one or more actuator commands.

2. The computer-implemented method of claim 1, wherein the state variables further comprise at least one of:
   an airspeed;
   a bank angle;
   an ambient temperature; or
   an actuator temperature.

3. The computer-implemented method of claim 1, wherein determining the one or more actuator commands occurs while the aircraft is in flight.

4. The computer-implemented method of claim 1, wherein the prioritization scheme comprises at least one of:
   a weighted algorithm;
   a cost function; or
   a data structure.

5. The computer-implemented method of claim 1, wherein determining the one or more actuator commands is further based on a flight mode.

6. The computer-implemented method of claim 5, wherein the prioritization scheme is configured to:
   prioritize, using the at least one hardware processor, actuating at least one first actuator in a first flight mode; and
   prioritize, using the at least one hardware processor, actuating at least one second actuator in a second flight mode.

7. The computer-implemented method of claim 1, wherein determining the one or more actuator commands is further based on a maximum lift coefficient.

8. The computer-implemented method of claim 1, further comprising:
   detecting, using the at least one hardware processor, a state of at least one actuator of the at least two actuators; and
   generating, using the at least one hardware processor, a warning signal if the state exceeds a predetermined threshold.

9. The computer-implemented method of claim 8, wherein the predetermined threshold comprises at least one of:
   a maximum torque of the at least one actuator of the at least two actuators; or
   a maximum temperature of the at least one actuator of the at least two actuators.

10. The computer-implemented method of claim 8, further comprising:
    automatically controlling, using the at least one hardware processor, the at least one actuator of the at least two actuators if the state exceeds a predetermined threshold.

11. The computer-implemented method of claim 1, further comprising:
    in response to receiving a command to override automatic control, ceasing, using the at least one hardware processor, automatic moving of the at least two actuators.

12. The computer-implemented method of claim 1, wherein the control surface or leading edge surface comprises at least one of:
    a flaperon;
    a slat;
    a Kreuger flap;
    a droop flap;
    a slotted flap;
    a spoiler;
    a morphing surface;
    an aileron;
    an elevon;
    a flapervateron;
    a ruddervator;
    a rudder; or
    an elevator.

13. The computer-implemented method of claim 1, wherein automatically moving the at least two actuators comprises independently moving, using the at least one hardware processor, each of two actuators, each of the two actuators configured to control a different control surface or leading edge surface of the aircraft.

14. The computer-implemented method of claim 1, wherein the prioritization scheme is continuous.

15. The computer-implemented method of claim 1, wherein the at least two actuators include at least one actuator associated with an inboard control surface and at least one actuator associated with an outboard control surface.

16. A system for controlling an aircraft, comprising:
    at least one processor; and
    at least one non-transitory computer-readable medium storing instructions that, when executed by the at least one processor, cause the at least one processor to perform operations comprising:
      measuring one or more state variables of the aircraft, wherein the one or more state variables comprise an actuator hinge moment;
      inputting the one or more measured state variables to a prioritization scheme configured to determine an optimized actuator setting;
      determining one or more actuator commands associated with the determined optimized actuator setting based at least in part on inputting the one or more measured state variables to the prioritization scheme; and
      automatically moving at least two actuators each associated with a different control surface or leading edge surface of the aircraft based on the determined one or more actuator commands.

17. The system of claim 16, wherein the state variables further comprise at least one of:
    an airspeed;
    a bank angle;
    an ambient temperature; or
    an actuator temperature.

18. The system of claim 16, wherein determining the one or more actuator commands occurs while the aircraft is in flight.

19. The system of claim 16, wherein the prioritization scheme comprises at least one of:
   a weighted algorithm;
   a cost function; or
   a data structure.

20. The system of claim 16, wherein determining the one or more actuator commands is further based on a flight mode.

21. The system of claim 20, wherein the prioritization scheme is configured to:
   prioritize actuating at least one first actuator in a first flight mode; and
   prioritize actuating at least one second actuator in a second flight mode.

22. The system of claim 16, wherein determining the one or more actuator commands is further based on a maximum lift coefficient.

23. The system of claim 16, wherein the operations further comprise:
   detecting a state of at least one actuator of the at least two actuators; and
   generating a warning signal if the state exceeds a predetermined threshold.

24. The system of claim 23, wherein the predetermined threshold comprises at least one of:
   a maximum torque of the at least one actuator of the at least two actuators; or
   a maximum temperature of the at least one actuator of the at least two actuators.

25. The system of claim 23, wherein the operations further comprise:
   automatically controlling the at least one actuator of the at least two actuators if the state exceeds a predetermined threshold.

26. The system of claim 16, wherein the operations further comprise:
   in response to receiving a command to override automatic control, ceasing automatic moving of the at least two actuators.

27. The system of claim 16, wherein the control surface or leading edge surface comprises at least one of:
   a flaperon;
   a slat;
   a Kreuger flap;
   a droop flap;
   a slotted flap;
   a spoiler;
   a morphing surface;
   an aileron;
   an elevon;
   a flapervateron;
   a ruddervator;
   a rudder; or
   an elevator.

28. The system of claim 16, wherein automatically moving the at least two actuators comprises independently moving each of two actuators, each of the two actuators configured to control a different control surface or leading edge surface of the aircraft.

29. The system of claim 16, wherein the prioritization scheme is continuous.

30. The system of claim 16, wherein the at least two actuators include at least one actuator associated with an inboard control surface and at least one actuator associated with an outboard control surface.

* * * * *